April 21, 1959 C. L. DU VIVIER 2,883,645

TRAFFIC ACTUATED CONTROL SYSTEM AND APPARATUS

Filed Dec. 2, 1957 6 Sheets-Sheet 1

INVENTOR.
Charles L. DuVivier
BY Edward W. Evans
ATTORNEY

| CAM CONTACT NUMBERS | CAMSHAFT POSITIONS 1 | 2 | 3 | 4 | 5 | 6 |
|---|---|---|---|---|---|---|
| 1 | X | | | | | |
| 2 | X | | | | | |
| 3 | | | X | | | |
| 4 | | | X | | | |
| 5 | | | | | X | |
| 6 | | | | | X | |
| 7 | X | X | | | | |
| 8 | X | X | | | | |
| 9 | | | X | X | | |
| 10 | | | X | X | | |
| 11 | | | | | X | X |
| 12 | | | | | X | X |
| 13 | X | X | X | | | |
| 14 | X | X | X | | | |
| 15 | | | X | X | X | |
| 16 | | | X | X | X | |
| 17 | | | | | X | X |
| 18 | | | | | X | X |
| 19 | | X | | X | | X |
| 20 | | X | | X | | X |
| 21 | | X | | X | | X |
| 22 | | | | X | | |
| 23 | | | | | | X |
| 24 | | X | | | | |
| 25 | | | | X | X | |
| 26 | X | | | | | X |
| 27 | | X | X | | | |
| 28 | | | | X | X | X |
| 29 | X | X | | | | X |
| 30 | | X | X | X | | |
| 31 | X | | X | | X | |
| 32 | X | | | | | |

INVENTOR.
Charles L DuVivier
BY
Edward H. Eames
ATTORNEY

INVENTOR.
Charles L. DuVivier
BY Edward W. Eames
ATTORNEY

INVENTOR.
Charles L. DuVivier
BY Edward W. Eames
ATTORNEY

INVENTOR.
Charles L. DuVivier
BY Edward W. Evans
ATTORNEY

| CONTROLLED BY | TRAFFIC FLOWS | PH. B | | PH. C | | PHASE A MINOR | | PHASE A MAJOR | | PH. B | |
|---|---|---|---|---|---|---|---|---|---|---|---|
| | | 1p | 2p | 3p | 4p | 5p | 6p | 7p | 8p | 9p | 10p |
| MMS/PC | ST. A NO. THROUGH AND RT. TURN | G | Y | R | R | R | R | G | G | G | Y |
| | ST. A SO. LEFT TURN | R | R | R | R | G | Y | R | R | R | R |
| MMN/PC | ST. A SO. THROUGH AND RT. TURN | G | Y | R | R | R | R | G | G | G | Y |
| | ST. A NO. LEFT TURN | R | R | R | R | G | Y | R | R | R | R |
| PC | STREET B | R | R | G | Y | R | R | R | R | R | R |

Fig. 5

Fig. 6

| | PH. B | | PHASE A MINOR | | | | PHASE A MAJOR | | PH. B | |
|---|---|---|---|---|---|---|---|---|---|---|
| | 11p | 12p | 13p | 13pa | 13pb | 14p | 15p | 16p | 17p | 18p |
| ST. A NO. THROUGH AND RT. TURN | G | Y | R | R | R | R | G | G* | G | Y |
| ST. A SO. LEFT TURN | R | R | G | G | G | Y | R | R | R | R |
| ST. A SO. THROUGH AND RT. TURN | G | Y | R | R | G | G | G | G* | G | Y |
| ST. A NO. LEFT TURN | R | R | G | Y | R | R | R | R | R | R |
| STREET B | R | R | R | R | R | R | R | R | R | R |

* G BECOMES Y IF NEXT PHASE IS PHASE C, I.E PHASE B IS SKIPPED

| | PH. B | | PHASE A MINOR | | PHASE A MAJOR | | PH. B | |
|---|---|---|---|---|---|---|---|---|
| | 21p | 22p | 23p | 24p | 25p | 26p | 27p | 28p |
| ST. A NO. THROUGH AND RT. TURN | G | Y | R | R | G | G | G | Y |
| ST. A SO. LEFT TURN | R | R | G | Y | R | R | R | R |
| ST. A SO. THROUGH AND RT. TURN | G | G | G | G | G | G | G | G |
| ST. A NO. LEFT TURN | R | R | R | R | R | R | R | R |
| STREET B | R | R | R | R | R | R | R | R |

Fig. 7

INVENTOR.
Charles L. DuVivier
BY
Edward H. Evans
ATTORNEY

United States Patent Office 2,883,645
Patented Apr. 21, 1959

2,883,645

TRAFFIC ACTUATED CONTROL SYSTEM AND APPARATUS

Charles L. Du Vivier, Darien, Conn., assignor to Eastern Industries, Incorporated, East Norwalk, Conn., a corporation of Delaware Application December 2, 1957, Serial No. 700,080

14 Claims. (Cl. 340—36)

This invention relates to an improved traffic control system or apparatus for the control of traffic at an intersection of roads or streets and in particular for individual control of certain movements of such traffic on a very flexible basis in response to actuation by such traffic.

It is well known in the field of traffic control that the total traffic flow from one approach into an intersection, for example, may be broken up into several movements of traffic and individually controlled in part by the addition of extra signal lights for such movements of traffic, be it vehicular or pedestrian.

The present invention provides an improved system or apparatus for control of individual groups of such traffic movements by actuation by the traffic movement itself to accord right of way to some of such movements upon demand of such traffic individually or concurrently and when there is no demand for exclusive such right of way, to yield right of way in part to other traffic movements not interfering therewith.

For convenience of reference in this disclosure, the term "phase" is generally employed to refer to a part of the traffic signal cycle serving a particular traffic movement or combination of movements with a right of way period, ordinarily followed by a clearance period, the term sometimes being applied to the corresponding part of the cycle of the traffic signal controller, or to identify the signals associated with such traffic movement or movements controlled together, for example. The term "traffic phase" is sometimes used for convenience to mark the traffic movements on one phase of the signal cycle. Also, in some instances, it will be assumed that a traffic phase may be divided into sub-phases for individual or groups of movements, so that for example, the left turn movement from the north approach, the left turn movement from the south approach, the through traffic movement (and right turn) from the north approach, the through traffic movement (and right turn) from the south approach, into an intersection may be referred to in some instances as phases or as sub-phases of a main traffic phase A.

The present invention has particular application as an improved system or apparatus for the control of traffic at two intersecting streets in which one of such streets has separate lanes set apart on its two approaches for left turn traffic movements from the respective two approaches, while other lanes are provided on such approaches for straight through traffic movement, or for straight through traffic movement along with right turn traffic movement from the respective approaches, for example, and the system or apparatus providing independent control of the two opposite left turn movements with respect to the opposing straight through movements, permitting both of said left turn movements to receive right of way concurrently in response to actuation by both but maintaining right of way interrupted for one of the left turn movements when non-actuated so as to permit accord of right of way to the opposing straight through movement interfering with the latter left turn movement but not interfering with the actuated left turn movement receiving right of way.

The present improved control system or apparatus provides for the aforesaid control of such traffic movements at the intersection in such a way that the period of accord of right of way for each left turn movement is flexibly timed in accordance with traffic demand so that such accord of right of way for the lighter of such two left turn movements can be terminated before the right of way for the heavier of such movements and thus the straight through movement opposing the lighter of such left turn movements can receive right of way sooner.

Also, the present improved system and apparatus provides for accord of right of way alternatively to the straight through movements on both approaches concurrently, and with the accompanying right turn movements from such approaches ordinarily, in one part of the traffic signal control cycle and to the several traffic movements from the intersecting street in another part of the traffic signal control cycle, in absence of traffic actuation by the left turn movements, both left turn movements having their right of way interrupted under this latter condition, and such accord of right of way alternatively to such straight through movements on the one street and to the traffic movements on the other street being in response to traffic actuation on these respective movements.

The present invention provides such control of traffic in a novel and improved manner by employing two "minor movement controllers" in association with the same one phase of a primary or "parent controller" of the three phase type by assigning said one phase and the next following phase of the parent controller on an overlapping basis for the control of such straight through traffic movements, and accompanying right turn movements, on the opposite approaches of the said one street, with the minor movement controllers providing for accord of right of way to the individual left turn lanes on the respective such approaches while interrupting temporarily the accord of right of way to the opposing straight through movements by the parent controller, and with the parent controller assigning its third phase to the other intersecting street in which all traffic movements are controlled jointly for example.

Certain features of such traffic control have been the subject of copending patent applications by myself and by John L. Barker, as more fully identified below, and the present invention is an improvement over the inventions of said copending applications also as more fully set forth below.

The provision of a traffic controller to control a minor traffic movement through actuation by such traffic movement, the minor movement controller being dependent upon a primary or parent controller normally controlling major traffic movements at a traffic intersection, is the subject of my copending patent application, Serial No. 697,036, filed on November 18, 1957 and entitled "Traffic Actuated Control Apparatus," and assigned to Eastern Industries, Incorporated, a Delaware corporation, the assignee of the present application. From one aspect my said copending application discloses how such a minor movement controller may be employed to control left turn traffic movements in general at a street intersection where one minor movement controller is associated with one phase of the primary or the parent controller and in effect splits such one phase into two parts, a minor part for the left turn or turns and a major part for the opposing straight through traffic on the same street, along with right turn traffic, for example. My said copending application also discloses how another minor movement controller may be associated with another phase of the parent controller for example.

A copending application of said John L. Barker also filed on November 18, 1957 under Serial No. 697,037, and entitled "Traffic Actuated Control System," and assigned to the same assignee as that of the present application, discloses a new combination of two such minor movement controllers with the same phase of a primary or parent controller by further subdividing the same one phase of the parent controller so that the two left turn movements may be individually controlled with respect to their opposing straight through movements by the minor movement controller in cooperation with the parent controller. Said latter copending application of John L. Barker also shows in general that such combination of two minor movement controllers on a single phase may be employed with either a two phase or a three phase parent controller, for example, the opposing straight through traffic movements being accorded right of way in said same one phase of the parent controller upon completion of the respective right of way periods of the minor movement controllers.

It is characteristic of such apparatus or systems involving minor movement controllers as disclosed in said copending applications that when the parent controller is resting in the phase with which the minor movement controller or controllers is or are associated, in absence of traffic actuation on the cross street phase for example, in an actuated type parent controller, the actuation of the minor movement controller by left turn traffic for example requires that the parent controller be called away from such one phase to another phase of its cycle and then back to such one phase in order for the proper accord of right of way by the minor movement controller or controllers at the beginning of such one phase of the parent controller cycle. Although such operation as in the copending applications is suitable for many forms of traffic control situations, the efficiency of operation could be improved by providing a system or apparatus which normally does not rest in such particular phase although it may rest in a corresponding condition as far as the signal display is concerned to accord right of way to the straight through traffic movements on the one street, which may be the major street at the intersection for example. With such important modification by the present invention, the system and apparatus may be operated between the right of way to the straight through movements and the alternative right of way to the left turn movements, for example, without having to accord right of way unnecessarily to the other intersecting street.

The present application is therefore directed to an improvement over said copending applications, and particularly over the copending application of John L. Barker, by assigning the control of the left turn movements by the minor movement controllers to the first part of one phase, phase A for example, of a three phase parent controller, and assigning the right of way for the opposing straight through traffic movements to an overlap of the second part of said one phase A and a following phase B of the parent controller, and assigning the accord of right of way to the other intersecting street to a third phase, phase C of such three phase parent controller, thus providing the more flexible and efficient operation just described above in general terms, and described more fully below in relation to the several figures of the drawings.

The present improved means of control of particular traffic movements by traffic actuation of such controlled traffic and providing for granting of the right of way for non-interfering traffic during the right of way period for the particular traffic movement, has particular value in eliminating more conflicts between interfering traffic movements such as left turns and opposing straight through movements for example, while permitting opposite non-interfering left turns to proceed together by the means and in the manner described to provide important additional flexibility and efficiency which is of great importance in heavily traveled intersections of multilane streets where the separate control of left turn traffic is of particular significance and where any saving of time by permitting non-interfering traffic movements to continue or to resume as soon as possible is also of great significance.

It is therefore a general object of the invention to provide an improved traffic control system controlling two minor or subordinate traffic movements on one particular phase of a traffic signal control cycle by the combination of two minor movement traffic controllers associated with the same one phase of a three phase primary or parent controller serving two major traffic movements, certain of said major movements being normally served together on a second phase of said parent controller and the other major movement or movements being served on the third phase of said parent controller, and which said certain movements are also served in a part of said one (first) phase of the parent controller following accord of right of way to the minor movements by the respective minor movement controllers associated with said one phase, each of said phases and part thereof according right of way in response to its respective associated traffic movement.

It is another object of the invention to provide a system of traffic control whereby some minor traffic movements are accorded right of way on traffic demand therein at a particular part of the traffic signal cycle of a three phase parent controller, by minor movement controllers individually or collectively, the control of some interfering traffic movements and other traffic movements being returned to the parent controller at the termination of such control by the minor movement controller or controllers, and in which said parent controller has one particular phase of its cycle assigned to accord right of way normally to such some of said traffic movements and to be superseded in part at said particular part of its cycle by the action of said minor movement controllers when the latter are actuated by the respective traffic movements, and in which an overlap of accord of right of way is provided between said one phase and the next following phase for such some of said traffic movements and in which a third phase is provided for right of way for said other traffic movements.

It is also an object of the invention to provide an improved system or apparatus to control traffic by the combination of minor movement controllers and a parent controller and in which means are provided for having accord of right of way to certain traffic movements overlap two out of three phases of a three phase traffic control cycle without overlapping a part of the one of such two phases in which the minor movement controllers provide their accord of right of way for their respective minor movements in response to actuation therein.

It is a further object of the invention to provide a traffic control system or apparatus for the control of traffic in two intersecting streets in one of which the traffic is separated into left turn movements and straight through movements from the respective approaches of said one street and in which the accord of right of way to the respective left turn movements and straight through movements is provided by the cooperation of two minor movement controllers and a parent controller having three phases in its traffic signal control cycle, in a first one of which phases the respective minor movement controllers accord right of way to the respective left turn movements in response to traffic actuation therein, while interrupting the accord of right of way to the respective opposing straight movements by the parent controller, while right of way is also interrupted on the other street by said parent controller, and in which said parent controller accords right of way to said straight through movements together in a next following second of its three phases while interrupting right of way on said other street and while right of way is interrupted for the left turn movements by the respective minor movement controllers in cooperation with the parent controller, and in which right of way is accorded in a third phase by the parent controller to said other street while right of way is interrupted in all of said traffic movements in said first street, and in which accord of right of way to said straight through movements overlaps the said second phase and a part of the first phase of the parent controller following accord of right of way to the respective left turn movements by the respective minor movement controllers, the said first phase of the parent controller cycle appearing only in response to actuation of at least one of the minor movement controllers by traffic in its associated left turn movement.

It is a further object of the invention to provide a traffic control system or apparatus as in the next preceding object and in which the accord of right of way for the respective traffic movements is for time periods variable between minimum and maximum limits in accordance with traffic actuation in the respective movements, with assurance of return of right of way to any traffic movement whose right of way was terminated by the maximum limit without requiring further traffic actuation therein.

Other objects may subsequently appear from the following description with respect to the several drawings, as well as from the appended claims.

Figure 3A:
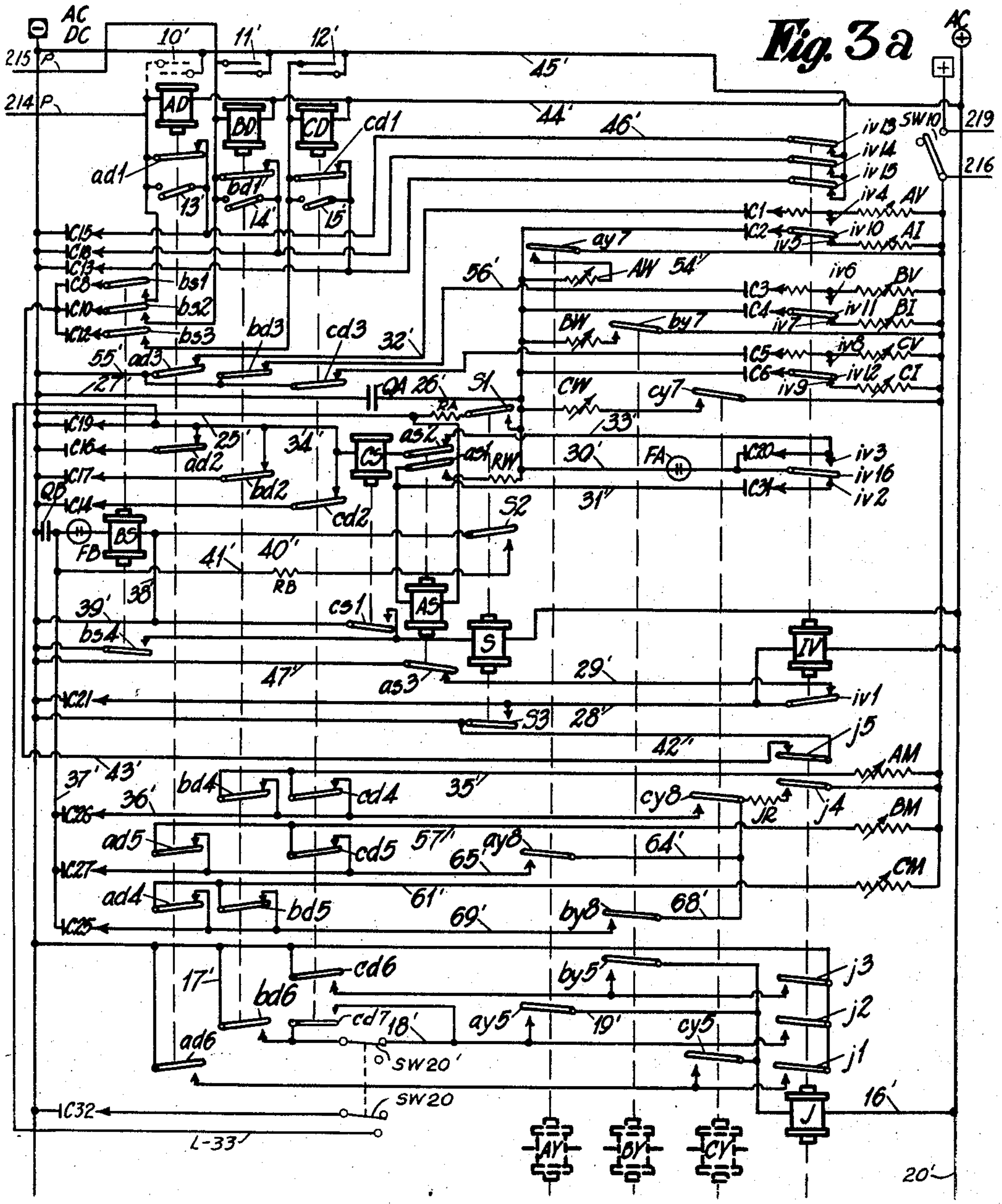
Figure 3B:
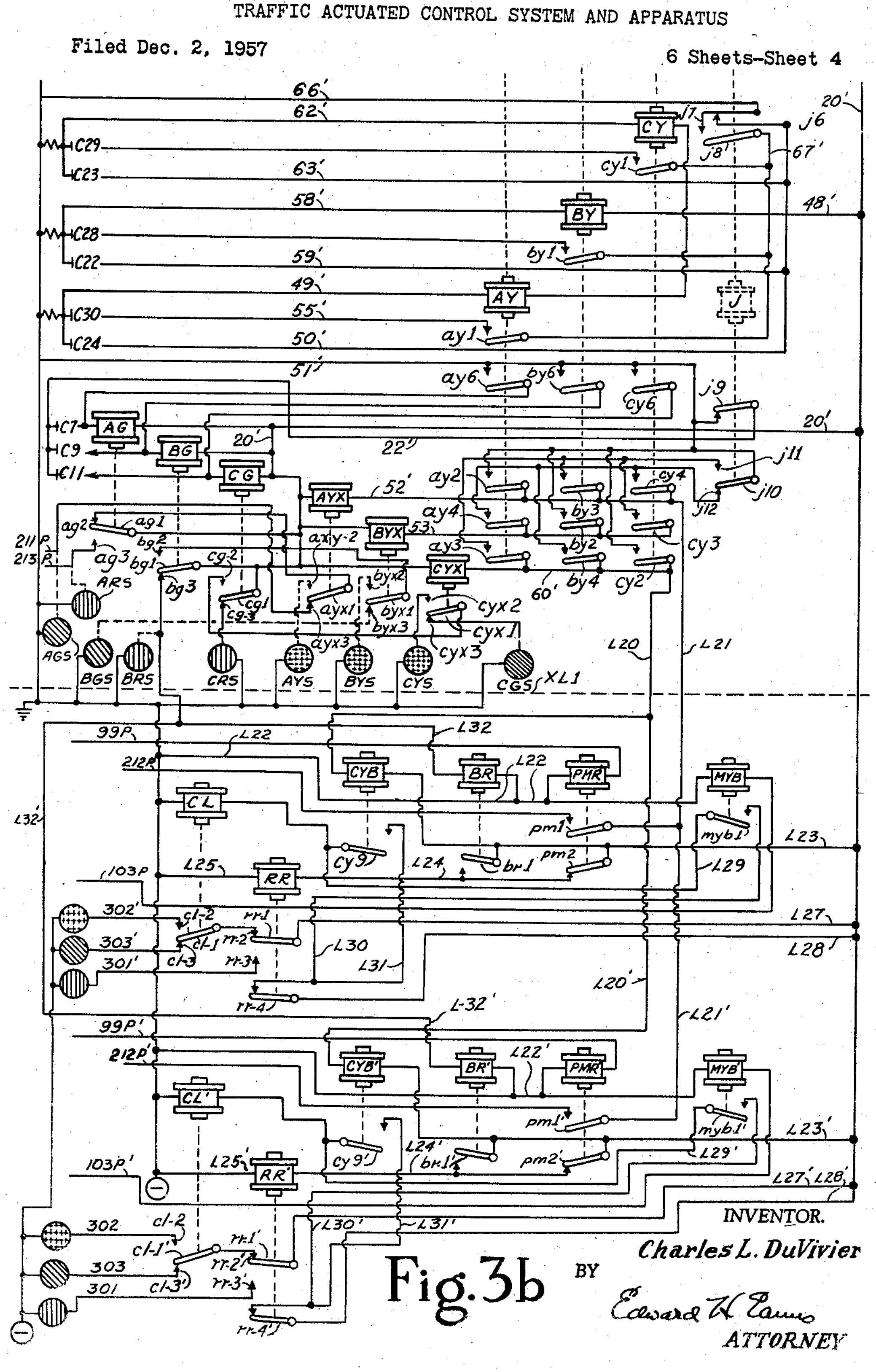

Figs. 3*a* and 3*b* together comprise a diagram in schematic form of one type of parent controller with associated overlap relay assemblies, that may be used in the present traffic control system.

Figures 2, 3C:
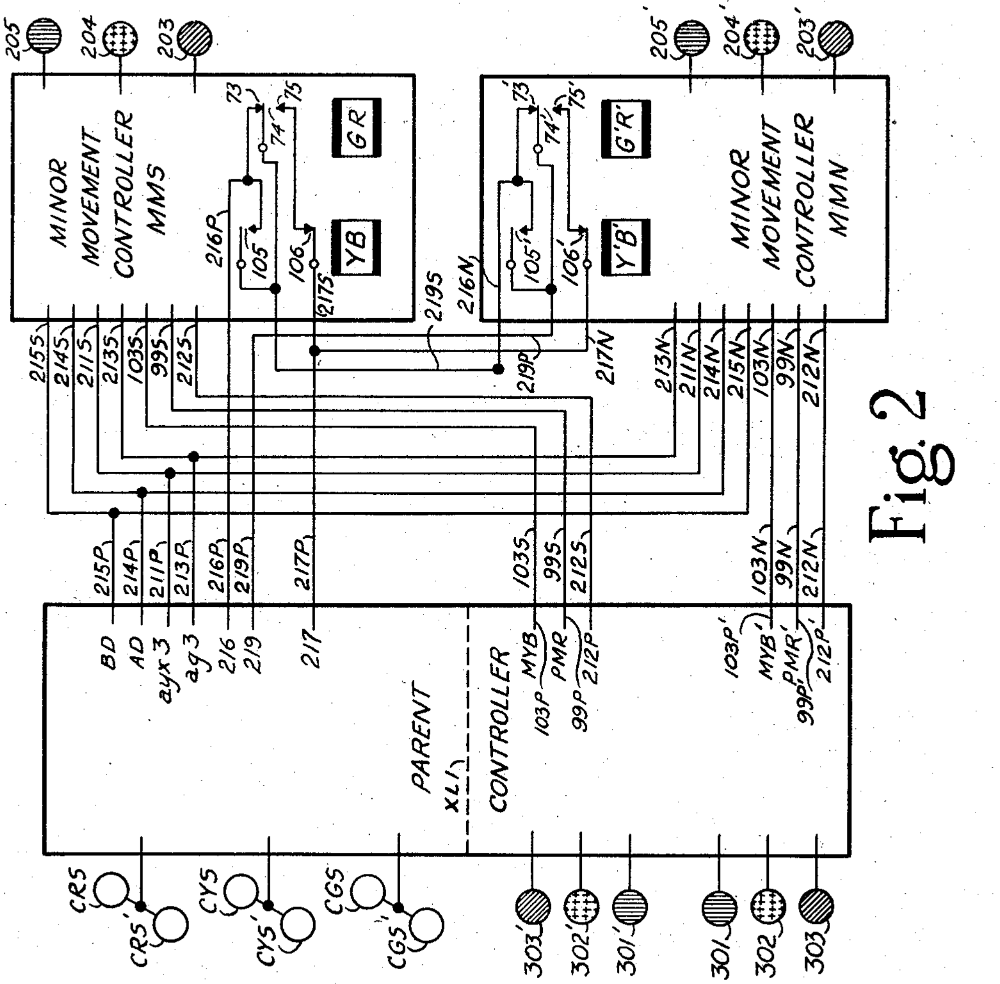
Fig. 2 is a diagram partly in block form, illustrating the interconnecting circuits between the parent controller, on the left, and two minor movement controllers, with signal lights appropriately controlled by each controller.

Fig. 3*c* is a cam contact sequence chart for the parent controller of Figs. 3*a*–3*b*.

Figure 4:
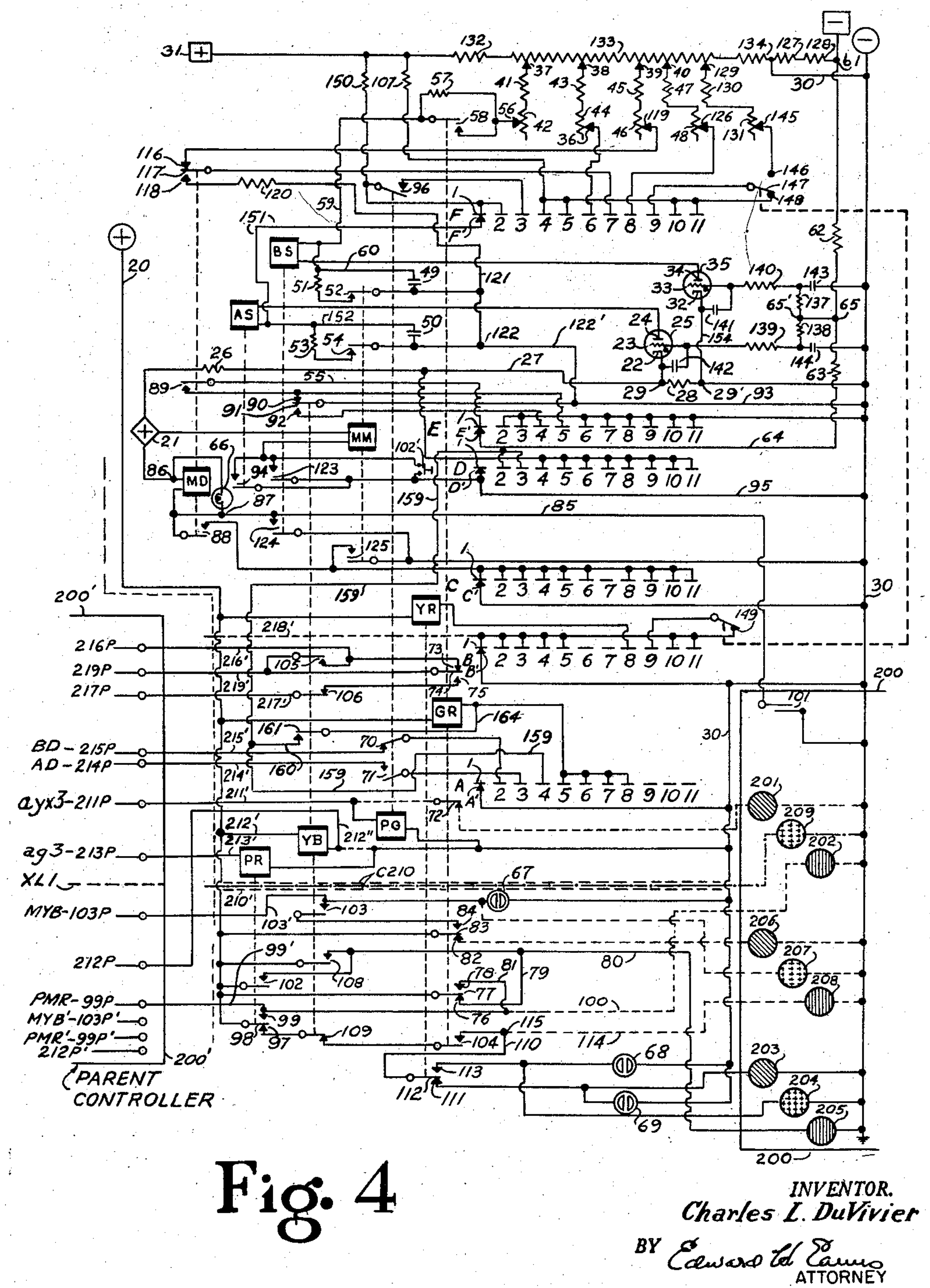

Fig. 4 is a diagram in schematic form of a minor movement controller with a parent controller, separated from the minor movement controller in the lower left by line 200', illustrating the electrical connections between the parent controller and one minor movement controller, and external elements such as signal lights and a vehicle detector shown in the lower right separated from the minor movement controller by line 200.

Fig. 5 is a phase sequence chart illustrating a complete phase cycle plus one phase of the parent controller with a minor phase of two controlled traffic movements inserted into the cycle.

Fig. 6 is a phase sequence chart illustrating one cycle of the parent controller, and illustrating the possible signal sequence of two minor phases when one minor phase terminates earlier than the other.

Fig. 7 is a phase sequence chart illustrating one cycle of the parent controller, and illustrating the possible signal sequence when the minor phase of one of two such controlled traffic movements is inserted into one phase of the cycle.

Consideration will now be given further to the general operation of the traffic control system herein. It is believed that such general description of the operation, which is to follow, will provide an introduction for the descriptions of the several figures that follow.

In the description below two minor movement controllers, one such minor movement controller being disclosed in Fig. 4, are employed with one three phase parent controller, the parent controller being disclosed in Figs. 3*a*–3*b*–3*c*, at the intersection of two roadways illustrated in Fig. 1.

Both minor movement controllers are associated with the same phase of the parent controller, for example phase A. The minor movement controllers will each control a left turn traffic movement from one of the intersecting streets, Street A for example, while the adjacent through and right turn traffic on Street A, for example, is associated with part of phase A and also a second phase, phase B, of the parent controller, for example, while the parent controller controls such traffic. All the traffic on the second of the intersecting streets, Street B, for example, will be associated with phase C of the parent controller and will be controlled by the parent controller.

Figure 1:
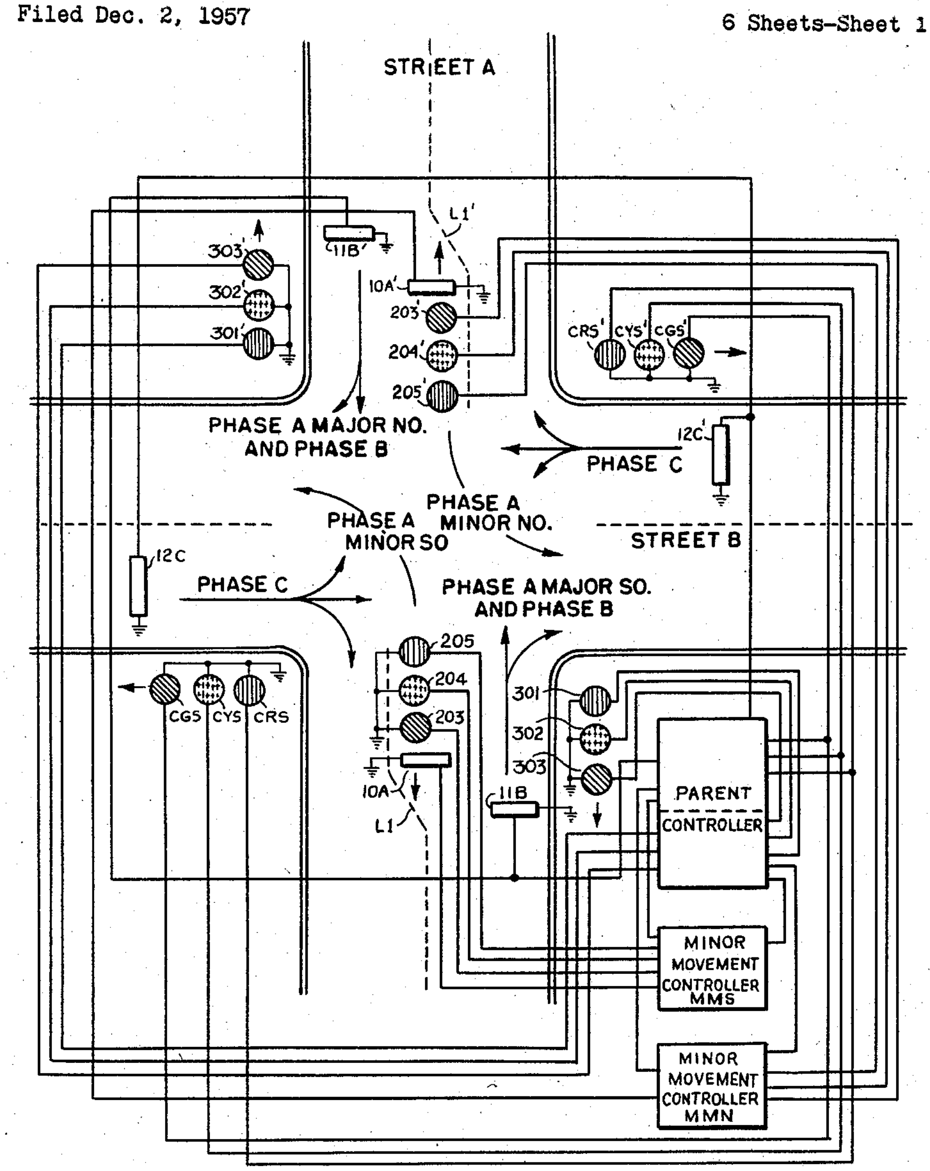
Fig. 1 is a diagram of a controlled intersection formed by two intersecting thoroughfares or streets illustrating signal lights of the conventional type, a parent controller and two minor movement controllers associated with the parent controller, and with associated traffic detectors.

As illustrated in Fig. 1 one minor movement controller, MMS for example, controls traffic signals that control the traffic flow in the left turn lane of the south approach of Street A while the other minor movement controller, MMN, for example, controls traffic signals that control the traffic flow in the left turn lane of the north approach of Street A.

When both minor movement controllers, MMS and MMN, for example, are actuated so that each will insert its minor phase into the cycle of the parent controller, the parent controller will move into the phase A position for example, and both minor movement controllers will begin their respective minor phases at the same time at the beginning of the same phase A of the parent controller.

Each minor movement controller will control the left turn traffic movement with which it is associated, and through certain control, as hereinafter described over a relay assembly associated with it the individual minor movement controller cooperates with the parent controller to control the diagonally opposite through and right turn traffic in the same street.

Since both minor movement controllers are identical and both have an extendible vehicle interval timer and a maximum interval timer associated with the same position of the respective rotary stepping switches, as will be later described, each may terminate its respective minor phase independently at the same time or at different times although both minor phases will be initiated individually at the same time when both have been actuated, dependent on traffic conditions in the left turn lanes.

Since each minor movement controller is independent of the other, one may be actuated to proceed through its cycle of operation for its associated minor traffic movement, while the other minor movement controller may remain at rest due to absence of actuation by its respective traffic movement.

Should this situation occur, the actuated minor movement controller will cause the parent controller to move into its phase A position and the actuated minor movement controller will accord right of way to the left turn traffic movement which it controls and cause the right of way of the diagonally opposite through and right turn traffic to be either interrupted or held withdrawn according to whether or not right of way had just previously been accorded to such traffic.

On the other hand the inactive minor movement controller will maintain interruption of right of way for the left turn traffic movement it controls and will either cause right of way to the diagonally opposite through and right turn traffic to be maintained or to be accorded depending on whether right of way had just previously been accorded there.

In the detailed description of his Patent 2,100,831, John L. Barker explains how his traffic controller is designed to skip a phase for which no demand has been made due to absence of its associated traffic. He also explains that the said traffic controller may rest in each of its three phases if there are no further demands for another phase. Therefore, at the termination of the minor phase of phase A the parent controller will move into the major phase of phase A and either come to rest or continue in its cycle and serve whatever demand the traffic had made, or will make thereafter.

The green and red signals illuminated during the major phase of phase A are identical to the green and red signals illuminated during the phase B of the parent controller. If the phase B of the parent controller should follow the major phase of phase A of the parent controller the phase A will not show a yellow clearance signal before its termination but will hold a green signal for through and right turn traffic on Street A, but the parent controller will advance out of its phase A position which is the major phase of phase A and advance into its phase B position.

If, on the other hand there is no call for phase B at the time and there is a call for phase C on the parent controller, the parent controller will skip through its phase A yellow and phase B green positions while the signals of the major phase A remain illuminated and will time the clearance interval of the major phase of phase A in the clearance interval position of phase B and upon termination of such clearance interval the parent controller will advance into its phase C green position and time out the phase C intervals. The phase skipping process of the parent controller is more fully described by John L. Barker in his Patent 2,100,831.

Because of the ability of the parent controller to skip a phase on which there is no demand, the phase A, into which the minor phase is inserted, may follow either phase B or phase C of the parent controller. By the same token the minor phase and major phase of phase A of the parent controller may follow either phase B or phase C.

Inherent in the features of operation of both the parent controller and the independently operated minor movement controller is the ability to sustain right of way to one of the through and right turn traffic flows on Street A, that is adjacent to one left turn traffic movement under the following conditions.

Let it be assumed that the parent controller is resting in phase B so that straight through and right turn traffic along Street A both north and south have the right of way, and that there is no traffic demand on Street B for the parent controller to produce the phase C signals for an appreciable length of time. Let it also be assumed that during such time there is an absence of left turn traffic from the north approach of Street A for example. However, assume also that there is appreciable left turn traffic from the south approach of Street A for example, together with through and right turn traffic on Street A.

Under such conditions the minor movement controller controlling the left turn traffic from the south approach will cause the parent controller to move into its phase A position, the minor movement controller controlling the left turn traffic from the north approach, having received no actuations will remain at rest. Therefore, only that minor movement controller that has been assumed to be actuated will insert its minor phase into phase A of the parent controller. Right of way will be accorded to the left turn traffic from the south approach and right of way will be withheld from a diagonally opposite through and right turn traffic on Street A during this minor phase of phase A.

However, the minor movement controller at rest will not accord right of way to left turn traffic movement from the north approach and the signals for such traffic will remain red while the diagonally oposite through and right turn traffic along Street A will receive right of way. Therefore, the condition now prevails where the left turn traffic from the south approach is accorded right of way while the adjacent through and right turn traffic from the south approach on Street A is also accorded right of way during the minor phase of phase A. Since it has been assumed that there is no traffic on Street B and there is traffic on Street A, the minor movement controller will terminate its minor phase and the major phase of phase A will begin.

During the major phase of phase A, right of way will be accorded to that through and right turn on Street A from which right of way had been withdrawn during the minor phase of phase A, and right of way will remain accorded to the diagonally opposite through and right turn traffic on Street A. At the same time both left turn traffic lanes will be denied right of way, right of way being withdrawn from the left turn traffic movement in the south approach of Street A and right of way held withdrawn from the left turn traffic movement on the north approach of Street A. Since it has been assumed that there is through and right turn traffic on Street A, the parent controler will advance to phase B from phase A without exhibiting a yellow clearance signal at the end of the major phase of phase A to the through and right turn traffic on Street A.

The above assumed traffic condition has illustrated a sustained right of way to through and right turn traffic on the south approach of Street A not only during phase B in which such right of way would normally be accorded but also overlapping through the minor phase part of phase A, the major phase part of phase A, and back into phase B to which it will be assumed the parent controller advanced at the termination of the major phase of phase A due to the presence of through and right turn traffic.

Fig. 1 herein represents an intersection of two streets, Street A and Street B for example. The curb lines of the intersection are illustrated by double lines. For the purpose of this illustration it shall be assumed that Street A serves north and south traffic and Street B serves east and west traffic. Street A differs somewhat from Street B in that Street A has a lane, marked by lines L1 on the south approach and L1′ in the north approach at the intersection, specifically set apart for vehicles making a left turn from Street A.

In the lower right quarter of the diagram a box marked "Parent Controller" and two boxes, marked "Minor Movement Controller MMS" and "Minor Movement Controller MMN," are representative of the parent controller which may be similar to the parent controller illustrated in Figs. *3a*–*3b*–*3c* and the minor movement controllers each of which is similar to the minor movement controller illustrated in Fig. 4.

The parent controller and the two minor movement controllers are interconnected electrically as is illustrated in Fig. 2 herein and explained below.

The parent controller directly controls the signals CRS, CYS and CGS, the red, yellow and green signals respectively, for vehicle traffic approaching the intersection from the west and signals CRS′, CYS′ and CGS′, the red, yellow and green signals respectively, for vehicle traffic approaching the intersection from the east along Street B as indicated by the small arrows adjacent to the signals. The larger arrows adjacent to the legend "Phase C" indicate the traffic movement from each approach to the intersection that the vehicle traffic may take during "Phase C" which is when in the cycle of operation of the parent controller, a green signal is illuminated to vehicle traffic on Street B indicating right of way for such traffic and followed by a yellow signal for clearance of such traffic.

Such traffic movements into the intersection from Street B may proceed straight through the intersection or make a right turn or left turn. Rectangles 12C and 12C′ represent vehicle detectors that are placed in the street, for example, to be actuated by vehicle traffic approaching the intersection along Street B over the respective vehicle detector so that a "call" is sent to the parent controller to which the detectors 12C and 12C′ are connected, for subsequent accord of right of way thereto.

The parent controller also controls the signals 301, 302 and 303, red, yellow and green respectively, which control vehicle traffic approaching the intersection from the south along Street A except left turn traffic, while the signals 301′, 302′, 303′, red, yellow and green respectively, control vehicle traffic approaching the intersection from the north along Street A, except left turn traffic.

The arrow marked "Phase A Major So. and Phase B"

indicates the traffic movements of vehicle traffic approaching the intersection from the south during the south major phase of phase A and also during phase B. The south major phase part of phase A is when in the cycle of operation of the parent controller, in cooperation with the minor movement controller MMN, the parent controller illuminates a green signal for such traffic from the south approach on Street A followed by a yellow signal for clearance. Such traffic may proceed during such right of way period, into the intersection from the south and execute a right turn or proceed straight through the intersection. The phase B is that part of the cycle of operation of the parent controller, when without need of cooperation of the minor movement controller or in absence of actuation of either of the latter, the parent controller illuminates a green signal to such through and right turn traffic movements approaching the intersection from both thhe north and the south along Street A. Thus phase B also includes the traffic flow as indicated by the arrow marked "Phase A Major No. and Phase B."

The arrow so marked "Phase A Major No. and Phase B" as well as indicating one half of the traffic flow of vehicle traffic during phase B also indicates the flow of traffic during the north major phase of phase A. The north major phase part of phase A is that part of the cycle of the parent controller when the parent controller with the cooperation of the minor movement controller MMS illuminates a green signal indicating right of way to such traffic flow followed by a yellow clearance signal, for vehicle traffic approaching the intersection from the north along Street A. Such traffic may proceed straight through the intersection or make a right turn.

The rectangles 11B and 11B' in the south approach to the intersection on Street A and the north approach on Street A respectively represent vehicle detectors that are placed in the street, for example for actuation by vehicle traffic approaching along Street A, other than left turn traffic, in the south and north approaches respectively, so that a "call" is sent by such actuation to phase B of the parent controller to which the detectors 11B and 11B' are connected.

The signals 205, 204 and 203, red, yellow and green respectively are the signals controlled by the minor movement controller MMS to which they are connected. These signals control the left turn traffic flow from the south on Street A indicated by the arrow marked "Phase A Minor So.". This traffic flow receives right of way during the south minor phase of the phase A. The south minor phase part of the phase A is that part of the cycle of operation of the controllers when the parent controller is in phase A and the minor movement controller MMS causes a green signal indicating right of way to traffic making a left turn from the south approach of Street A followed by a clearance signal for such traffic and cooperates with the parent controller to withhold right of way from the diagonally opposite through and right turn traffic flow of Street A.

The signals 205', 204' and 203' red, yellow and green respectively are the signals connected to and controlled by minor movement controller MMN. These signals control the left turn traffic flow, from the north on Street A indicated by the arrow marked "Phase A Minor No.". This traffic flow receives right of way during the north minor phase of phase A. The north minor phase part of phase A is that part of the cycle of operation of the controllers when the parent controller is in phase A and the minor movement controller MMN causes a green signal indicating right of way to traffic making a left turn from the north approach of Street A, followed by a clearance signal for such traffic and cooperates with the parent controller to withhold right of way from the diagonally opposite through and right turn traffic flow of Street A.

The rectangle marked 10A represents a vehicle detector. This detector is placed in the roadway, for example, and particularly in the left turn lane of the south approach so that the vehicle detector 10A will be actuated only by vehicles whose drivers intend to execute a left turn from such traffic lane. The detector 10A is connected to and sends "calls" to the minor movement controller MMS.

The rectangle marked 10A' represents a vehicle detector that is placed in the roadway, for example in the left turn lane of the north approach of Street A. This detector will be actuated only by vehicles whose drivers intend to execute a left turn from this left turn lane in the north approach from Street A. The detector 10A' is connected to and sends "calls" to the minor movement controller MMN.

Fig. 2 is a diagram partly in block and partly in schematic form illustrating a parent controller of the present type and two minor movement controllers and the several interconnecting electrical connections.

The rectangle marked parent controller represents a parent controller as in Figs. 3*a*–3*b*–3*c* with the signals CGS, CYS, CRS, CGS', CYS' and CRS' extending from the parent controller by which they are controlled, above the broken line XL1. These signals include two sets of red, yellow and green signals that are the phase C signals and appear in Figs. 1 and 3*b* with corresponding letters except for omission of the prime mark in Fig. 3*b*. The signals 301, 302 and 303, and 301', 302' and 303' extending from the parent controller, by which they are controlled, below the broken line XL1, include two sets of red, yellow and green signals that are the phase B signals and appear in Fig. 1 and Fig. 3*b* with corresponding numbers.

They are also the signals of the south and north major phase of phase A respectively, illustrated in Fig. 1.

The two rectangles to the right of the parent controller represent two minor movement controllers, MMS and MMN. The signals 205, 204 and 203 are illustrated extending from minor movement controller MMS by which they are controlled. These signals include a red, yellow and green signal of the south minor phase of the phase A signals and appear in Fig. 1 and Fig. 4 with corresponding numbers. The signals 205', 204' and 203' are illustrated extending from minor movement controller MMN by which they are controlled. These signals include a red, yellow and green signal of the north minor phase of the phase A and appear in Figs. 1 and 4 with corresponding numbers, except that in Fig. 4 no prime mark appears.

The relays YB and GR, with their associated contacts are illustrated in minor movement controller MMS and appear in a deenergized position. These relays and their associated contacts are comparable to the relays YB and GR and their associated contacts of the minor movement controller in Fig. 4 and are similarly labeled for convenience of identification.

The relays Y'B' and G'R' and their associated contacts are illustrated in minor movement controller MMN and appear in a deenergized position. These relays and their associated contacts are comparable to the relay YB and GR and their associated contacts of the minor movement controller in Fig. 4 and are similarly labeled except for a "prime" mark for convenience of identification.

Wherever it is practical similar component parts and similar lines in Fig. 2 have either identical or similar labels or numbers with corresponding parts and lines in Figs. 1, 3*a*, 3*b* and 4, for convenience of reference. The cam contact numbers of Fig. 3*c* are corresponding to those of Figs. 3*a*–3*b* except for the omission of "C" before each number along the left column in Fig. 3*c*.

Line 215P extending from the parent controller is connected to line 215S, which extends to the minor movement controller MMS, and to line 215N which extends to minor movement controller MMN. These constitute a parallel connection and are part of the minor movement controller to parent controller "call" circuits. The line 215P is connected to the ground side of the coil of the relay BD of the parent controller.

The line 214P extending from the parent controller is connected to line 214S of the minor movement controller MMS and also to line 214N of the minor movement controller MMN. These circuits also constitute a parallel connection and are also part of the minor movement controller to parent controller "call" circuits. The line 214P is connected to the ground side of the coil of the relay AD of the parent controller.

The line 211P extending from the parent controller is connected to line 211S of the minor movement controller MMS and in parallel to line 211N of the minor movement controller MMN. The line 211P is connected to contact *ayx*3 of the parent controller while line 211S is connected to the relay PG (not shown) of the minor movement controller MMS while line 211N is connected to the relay PG (not shown) of minor movement controller MMN, which relays are similar in both minor movement controllers and appear in Fig. 4.

The line 213P extending from the parent controller is connected to line 213S of the minor movement controller MMS and in parallel to the minor movement controller MMN via line 213N. Line 213 P is connected to contact *ag*3 of the parent controller while the line 213S is connected to relay PR (not shown) of the minor movement controller MMS and line 213N is connected to relay PR (not shown) of minor movement controller MMN, which relays are similar in both minor movement controllers and appear in Fig. 4.

The line 219P extending from the parent controller is part of the minor movement controller to parent controller timing control circuit. The circuit is connected in series from the parent controller through line 219P to the minor movement controller MMN and is completed either through contact 105′ of relay Y′B′ when the relay is energized or through contact 73′/74′ of relay G′R′ when relay G′R′ is deenergized, through line 216N to line 219S to the minor movement controller MMS through contact 105 of relay YB when the relay is energized or through contact 73/74 of relay GR when the relay GR is deenergized to line 216P. As illustrated in Fig. 3*a* this circuit when completed from line 219P through the series circuit described to line 216P completes the D.C. power supply for timing in the parent controller.

Either minor movement controller MMS or MMN may cause an opening in the circuit described above by the combination of relay YB being deenergized and relay GR being energized, thus causing contacts 105 and 73/74 to be open at the same time, or contacts 105′ and 73′/74′ to be open at the same time, thereby opening the D.C. power supply in the timing circuit of the parent controller to stop the timing of the parent controller.

Also illustrated in Fig. 2 are the circuits for a second method of control of parent controller timing by the minor movement controllers. This second method is explained in detail in my aforementioned copending application and involves opening the parent controller timing power circuit by use of a relay contact in the line of the power supply of the parent controller. The relay to open such contact, would be energized from a power supply and through contacts of relays YB and GR in one minor movement controller, which contacts are in series as shown in Fig. 4 and Fig. 2 herein. Such relay may be referred to as a "stop timing" relay.

Line 219P would supply the power through a circuit to the minor movement controller MMN, through closed contact 74′/75′ of relay G′R′ when the relay is energized, through closed contacts 106′ of relay Y′B′ when relay Y′B′ was deenergized to line 217N to line 217P. Line 217P would be connected to the coil of the stop timing relay (not shown) in the parent controller which would be then connected to ground. Switch SW10, shown in Fig. 3*a* as open would be closed and line 216P would be disconnected from the interconnecting circuits.

A parallel circuit to energize such stop timing relay through line 217P would be connected as follows, from line 219P to the minor movement controller MMN, through contact 73′/74′ of relay G′R′, when relay G′R′ is deenergized, lines 216N, 219S to the minor movement controller MMS, through contact 74/75 of relay GR when relay GR is energized, contact 106 of deenergized relay YB, lines 217S to 217P.

With such parallel circuits to energize the stop timing relay in the parent controller to open the D.C. power supply in the parent controller, either minor movement controller may cause the energizing circuit to close; however, when both minor movement controllers are actuated the minor movement controller MMN, for example, will close such energizing circuit since the parallel circuit for energizing such relay in the parent controller by minor movement controller MMS must pass through contacts 73′/74′ of relay G′R′ of minor movement controller MMN.

The line 103S is connected between the minor movement controller MMS and the parent controller. Alternating current power from the minor movement controller MMS is supplied through several contacts in the latter to contact 103 of relay YB as shown in Fig. 4, through line 103S to the parent controller to line 103P and to relay MYB as shown in Fig. 3*b*.

Line 99S is connected between the minor movement controller MMS and the parent controller. Alternating current power from the minor movement controller MMS is supplied through several contacts to contact 99 of relay PR in minor movement controller MMS as shown in Fig. 4, through line 99S to the parent controller to line 99P and to relay PMR as shown in Fig. 3*b*.

The line 212S is connected between the parent controller and minor movement controller MMS. The line 212S is connected to the ground side of relay YB in the minor movement controller MMS and then to the parent controller at line 212P to supply a ground connection to the relay YB through contacts of the parent controller as seen in Fig. 3*b*.

The line 103N is connected between the parent controller and minor movement controller MMN. Alternating current power from the minor movement controller MMN is supplied through several of its contacts through contact 103 of relay YB as shown in Fig. 4, through line 103N to the parent controller to line 103P′ and relay MYB′ as shown in Fig. 3*b*.

The line 99N is connected between the minor movement controller MMN and the parent controller. Alternating current power from the minor movement controller MMN is supplied through several of its contacts to contact 97 of relay PR as seen in Fig. 4, through line 99N to the parent controller to line 99P′ and to relay PMR′ as shown in Fig. 3*b*.

The line 212N is connected between the minor movement controller MMN and the parent controller. The line 212N is connected to the ground side of relay YB and the ground circuit follows through line 212N, into the parent controller at line 212P′, through several contacts of the parent controller to ground as seen in Fig. 3*b*.

Figs. 3*a* and 3*b* combine together, with Fig. 3*a* placed above Fig. 3*b* to illustrate a parent controller that may be employed in the present traffic control system. Fig. 3*c* shows a chart of the closure of the cam contacts of such controller in the several positions of the six position cam shaft. Figs. 3*a*, 3*b* and 3*c* are referred to together sometimes as Fig. 3, for convenience.

It will be noted that a broken line XL1 appears drawn horizontally across Fig. 3*b*. All of Fig. 3*a* and that part of Fig. 3*b* above the broken line XL1 combine to illustrate a three phase, full actuated traffic controller similar to the three phase, full actuated traffic controller presented in the aforementioned U.S. Patent 2,100,831, along with other parts of a control system such as traffic signals and traffic detectors or traffic actuated means. The traffic controller presented in Fig. 3*a*, and that part of Fig. 3*b* above the broken line LX1, along with Fig. 3*c*, is slightly modified with respect to the traffic controller presented in the said patent as pointed out below.

Several of the lines and parts of the traffic controller here presented are presented in broken lines. Those parts so illustrated are not necessary when the traffic controller is employed as a parent controller on the present system but the parts are necessary for independent operation of the traffic controller as a traffic controller.

It will be noted that contact 10' in Fig. 3*a*, representing a vehicle detector, is in phantom form and that the leads for several signal lights in Fig. 3*b* are also represented in phantom or broken line form indicating for example that such parts, although employed for full actuated, independent operation of the traffic controller as in the Patent 2,100,831, are not needed in the present case.

The signal lights DRS, DYS, and DGS presented in the aforementioned patent have been eliminated herein as seen in Fig. 3*b*.

In the upper right of Fig. 3*a* the D.C. power line to the timing potentiometers is modified to include switch SW10, which appears open and line 219 above the switch extending from the D.C. power supply and line 216 below the switch SW10, extending from the D.C. power line. These lines are connected through the minor movement controllers as described above with reference to Fig. 2.

The lines 215P and 214P in the upper left of Fig. 3*a* extend from the lines leading to the coils of relays AD and BD respectively and are connected to the minor movement controllers as previously described in Fig. 2.

It should be noted that in Fig. 3*b* one set each of three sets of three signals, red, yellow and green are illustrated above the line XL1. It should be understood that multiple sets of similar signals may be used by connecting such additional sets of signals in parallel with the signals to be duplicated.

Below line XL1 in Fig. 3*b* are two identical relay assemblies connected in parallel to the traffic controller via lines L20 and L21. Each of the relay assembly units is associated with one minor movement controller and each relay assembly unit controls one set of signals as indicated in the lower left of Fig. 3*b*.

Several lines extending from each relay assembly, 99P, 212P and 103P, for example, are illustrated extending from the upper relay assembly and lines 99P', 212P' and 103P', for example are illustrated extending from the lower assembly. These lines are some of the interconnecting lines between the parent controller and the minor movement controllers as illustrated in Fig. 2.

The signal lights CRS, CYS and CGS, red, yellow and green respectively are external to the controller but shown internally in the drawing for convenience. These signals are controlled directly by the parent controller and are the phase C signals. These signals appear in Fig. 1 and control street B thereon and also appear in two sets, one set with a prime mark on both Fig. 1 and Fig. 2.

The signals 301', 302' and 303', red, yellow and green respectively are also externally located but are here shown internally for convenience. These signals appear in Fig. 1 and Fig. 2 and are the signals that control the phase A major north traffic flow as seen in Fig. 1. They are also half of the phase B signals. The signals 301', 302' and 303' are controlled in part by the coordinated action of the parent controller and the minor movement controller MMS via the upper relay assembly.

The signals 301, 302, and 303, red, yellow and green respectively are also external elements and shown internally for convenience. These signals appear in Fig. 1 and Fig. 2 and are the signals that control the phase A major north traffic flow as seen in Fig. 1. They are also the remaining half of the phase B signals. The signals 301, 302 and 303 are controlled in part by the coordinated action of the parent controller and the minor movement controller MMN via the lower relay assembly.

The lines 211P and 213P extending from the contacts *ayx*3 of relay *AYX* and *ag*3 of relay AG respectively are additional interconnecting lines between the parent controller and the minor movement controllers as also illustrated in Fig. 2.

The power through contact *ayx*3 is used to energize the relay PG in the minor movement controller and the power through contact *ag*3 is used to energize relay PR in the minor movement controller.

A further modification of the traffic controller of the U.S. Patent 2,100,831 is the inclusion of cam contact C32 and switch SW20 which switch when open, as shown in Fig. 3*a*, opens the cam contact C32 circuit so that the closure of cam contact C32 has no effect on the circuit. Associated with this modification is the inclusion of a second switch SW20', here shown closed, employed to shunt out a contact *cd*7 on the relay CD, a further modification. The line 18' includes switch 20' and contact *cd*7 bridges the switch 20' on line 18'.

The switch SW20', which appears closed, and switch SW20, which appears open are ganged. In this position shown the modification has no effect on the traffic controller as presented in the aforementioned patent.

With the foregoing in mind, operation of the traffic controller, which is more fully disclosed in detail in U.S. Patent 2,100,831 as an independent controller, shall now be discussed.

For the purpose of independent operation of the parent controller of Fig. 3*a*, the upper part of Fig. 3*b* and Fig. 3*c* as in the Patent 2,100,831 it will be assumed that the switch SW10 is closed, although when operating as a part of the present invention this switch will be open as shown.

The controller shown in Fig. 3*a* and that part of Fig. 3*b* above broken line XL1 includes three timers. One, consisting of relay AS, tube FA and condenser QA, times the initial interval of the go signal period in each phase. A different charging resistance for condenser QA in each phase permits the initial intervals to be of different lengths in the different phases.

Another timer, including relay CS, tube FA and condenser QA employing the same condenser and tube as the initial interval timer but in which relay AS of the initial interval timer is replaced by relay CS, serves to time the vehicle intervals of the go signal period and the amber of warning signal period in each phase. The period of this timer is also independently adjustable in each interval which it times. When timing the vehicle interval portion of the go signal period this timer is subject to reset by traffic actuations in the lane wherein the go signal is being displayed.

A third timer, called the maximum timer, consisting of relay BS, tube FB and condenser QB, times a maximum period beyond which moving traffic in the go signal phase cannot hold the right of way against a call in another phase. The maximum period for each phase is independently adjustable. This timer is also provided with a special low resistance condenser charging circuit which is used to move the cam shaft rapidly through the intervening positions when a phase is to be skipped under the circumstances previously described.

The maximum timer is so arranged that whenever the right of way has been called to any phase it will operate during all subsequent intervals until the right of way has been accorded to the phase to which it has been so called. This timer will therefore be effective to move the cam shaft into its next position at the end of a predetermined period, such period being long enough so that the maximum timer will not operate to do this until the period of the timer normally timing each such interval has expired, and the said timer normally timing such interval has therefore obviously failed to function in its usual manner.

Relays AD, BD and CD are responsive to actuations of the traffic detectors 10', 11' and 12' located in the A, B and C phase lanes respectively. The traffic detector 10' is shown in broken line form in Fig. 3*a* since this detector is omitted in the present invention, although it is used in the independent operation of the parent controller in accordance with U.S. Patent 2,100,831 as presently considered. Each of these relays AB, BD and CD is effective to call the right of way to the phase with which it is associated when the detector in this phase is actuated during the warning or clearance or stop signal display period therein and each is effective to cooperate with the vehicle interval timer to prolong the go signal display period in the phase with which it is associated when operated by traffic during the vehicle interval portion of the said go signal display period.

Switch 13' when closed causes relay AD to operate and lock-in over a holding circuit so as to call the right of way to phase A but the holding circuit for relay AD is open at another point during the vehicle interval portion of the phase A go signal period so that the energization of relay AD to extend the phase A go signal display period can be occasioned only by traffic actuations of the A phase detector as explained above. Switches 14' and 15' cooperate similarly with relays BD and CD respectively.

If all three of these switches are open the right of way will remain on the phase to which it was last called until a traffic actuation occurs in another phase. With only one of these switches closed the right of way will in the absence of traffic normally revert to the phase with which this switch is associated, thus giving an arterial system. With any two or all three of these switches closed a reverting system will result in which the right of way, in the absence of traffic, will normally be accorded successively in a predetermined order to the phases with which the closed switches are associated. The right of way under the reverting system will remain on each phase to which it is accorded for a minimum time period extendible to a maximum time period by traffic actuations.

If the go signal display period on phase A is terminated by operation of the maximum timer instead of by operation of the vehicle interval timer, so that the last vehicle which actuated the detector in phase A did not have a full vehicle interval in which to pass through the intersection, a call for the return of right of way is automatically set up through the operation of relay AD by the maximum timer when the latter operates.

Relays BD and CD are similarly operated to put in an automatic right of way return call to their respective phases if the right of way period is terminated therein through the operation of the maximum timer.

If the right of way is called to a phase other than that normally next in the order of progression as has been explained, the cam shaft is stepped rapidly and without signal display change through the positions wherein the preliminary warning signal and the go signal would normally be displayed to the omitted phase. This effect is accomplished in accordance with the patent by the operation of relay J which is arranged so that when a phase is to be omitted, this relay will be operated at the beginning of the warning signal period of the preceding phase and will be thereupon effective to energize the previously mentioned rapid stepping timing circuit associated with the maximum timer which will carry the cam shaft quickly through the intervening positions to its proper destination.

In addition to the above, relay J cooperates in selecting the phase to which the right of way is next to be accorded and causing a warning signal to be displayed therein simultaneously with that displayed in the phase from which the right of way is being withdrawn. The method by which this is accomplished is explained in detail in U.S. Patent 2,100,831.

The initial interval and the vehicle interval period of the go signal display period of each phase are timed in one cam shaft position, there being one such cam shaft position for each of the three primary independent phases. For example, both of the above mentioned portions of the phase A go signal period are timed while the cam shaft remains in position 1, those for phase B are timed while the cam shaft is in position 3 and those for phase C are timed while the cam shaft is in position 5.

At the end of each initial interval relay AS of the initial interval timer operates and deenergizes relay IV. The deenergization of relay IV causes circuit changes which terminate the initial interval and institute the succeeding vehicle interval period of the go signal period without changing the cam shaft position or signal display, all of which is explained in detail in the U.S. Patent 2,100,831.

Relays AG, BG, CG, AY, BY, CY, AYX, BYX and CYX are effective to control the signal display in the several phases and to properly connect some of the timing circuits therefor as will be explained later in the detailed description of the operation of the system through a complete cycle of signal changes.

With traffic waiting on each phase the right of way, as previously mentioned, will be accorded to the three phases in the order, A, B and C.

As the right of way is withdrawn from a phase there are, as previously explained, two possibilities. Either it will be accorded to the phase next in the normal order of progression or, if there is no right of way call thereon, it will skip this phase and be accorded to the one beyond. The condition of relay J indicates to which of these phases the right of way has been called and so determines which of these phases is to be accorded the right of way.

If there is a call for the right of way on the phase next in the normal order of progression, relay J will be in deenergized condition and the sequence of operation will be such that the right of way will be accorded to such next phase. If, one the other hand, there is no such call for the right of way to the phase next in the normal order of progression and there is a call for the right of way to be accorded to the phase beyond, relay J will be energized at the beginning of the warning signal period of the phase from which the right of way is being withdrawn. This operation of relay J will cause a different sequence of operations to occur and cause the right of way to be accorded to the phase beyond the one next in the normal order of progression.

If the right of way is to be accorded to phase B, relay BD will have been operated. Both of the other two circuits supplying negative power to relay J are open in the phase A warning signal period, position 2. It follows that when the right of way is leaving the A phase and going to the B phase, relay J will be deenergized.

If the right of way had not been called to phase B, relay BD would not be operated and an energizing circuit for relay J would be closed. As soon as relay J does so operate, a by-pass for certain contacts which will hold relay J energized would be closed. With relay J so energized a closed contact prevents a phase B actuation, occurring during the transfer of right of way from phase A to phase C, from interrupting said transfer after it is started.

The operation of relay J during the phase A warning signal period causes a special rapid timing circuit of the maximum timer to function to start the cam shaft rapidly through phase B positions all of which is explained in detail in the aforesaid Patent 2,100,831.

The other two mentioned similar conditions to energize relay J during the phase B or the phase C warning signal periods wherein the relay J functions to effect other phase skips are of the same nature as those described above in connection with the phase A warning signal period.

The complete cycle of operation of the traffic controller consists of six positions, two positions of the cam shaft per phase for the three phases. Cam shaft positions 1 and 2 are associated with phase A, positions 3 and 4 are associated with phase B and positions 5 and 6 are associated with phase C.

In the odd numbered positions of each phase an initial interval followed by a vehicle interval of the green signal associated with the respective phases are timed in order. In the even numbered positions of each phase the clearance interval associated with that phase is timed.

The controller presented in Fig. 3*a* and that part of Fig. 3*b* above line XL1 is presented in its position 1 and is illustrated timing the initial interval of phase A. Upon termination of the phase A initial interval the vehicle interval of phase A will be timed.

At the termination of the vehicle interval of phase A the cam shaft is advanced to position 2 since, as illustrated, a "call" is in for phase B and also for phase C as shown by the relays BD and CD being energized. In position 1 the green signal AGS and red signals BRS and CRS, shown in Fig. 3*b* just above broken line XL1, are illuminated.

In position 2 the green signal AGS is extinguished and the yellow signal AYS is illuminated as signals BRS and CRS remain illuminated while the clearance interval of phase A is timed.

The advance to position 3 occurs at the termination of the clearance interval as the yellow signal AYS and red signal BRS are extinguished and the red signal ARS and green signal BGS are illuminated, and the red signal CRS remains illuminated.

In position 3 the phase B initial interval and vehicle interval are timed respectively and the cam shaft is advanced to position 4 on the termination of the vehicle interval. The signal BGS is extinguished and yellow signal BYS is illuminated in position 4 while signals ARS and CRS hold illuminated.

The clearance interval of phase B is timed and upon termination the cam shaft advances to position 5. The signals BYS and CRS are extinguished and signals BRS and CGS are illuminated as signal ARS holds as before.

The initial interval and vehicle interval of phase C are timed in position 5 and upon termination of the vehicle interval of phase C the cam shaft is advanced into position 6. The signal CGS is extinguished and signal CYS, a yellow signal of phase C, is illuminated while signals ARS and BRS hold as before.

At the termination of the clearance interval of phase C the cam shaft is advanced to position 1 and extinguishes signals CYS and ARS while illuminating signals CRS and AGS and holding signals BRS illuminated.

The operation from position 5 to position 6 to position 1 to transfer right of way from phase C to phase A as just described above assumes that the relay AD was reoperated as by another actuation on phase A for example.

As more fully explained in the aforesaid Patent 2,100,831 the traffic controller may rest in any phase when there is a lack of demand to serve other traffic. The controller will rest in that part of the odd numbered position during which the vehicle interval is timed in any one phase.

Consideration will now be given to the parent controller as presented in Fig. 3*a*–3*b* which includes the traffic controller modified as mentioned above by the twin relay assembly units below the line XL1 in Fig. 3*b*. The parts of those circuits illustrated in broken lines in Fig. 3*a*–3*b* shall be assumed to be eliminated from the circuit when the parent controller is employed with two minor movement controllers as in the present invention.

Let it be assumed that the minor movement controllers MMN and MMS are interconnected to the parent controller as described in Fig. 2. Switch SW10 in the D.C. power supply circuit would be open as presented in the upper right of Fig. 3*a*, and ganged switches SW20—SW20' would be open and closed respectively also as presented in Figure 3*a*. Further let it be assumed that the minor movement controllers are both at rest and remain at rest.

Although Figs. 3*a*–3*b* are presented in the parent controller position 1, let it be assumed that the parent controller is in its position 3, the green period of phase B with a "call" in for phase C. Since both minor movement controllers are at rest there would be no "call" for phase A, the phase with which the minor movement controllers are here associated.

During position 3 of the parent controller the relays CL, CYB, BR and MYB of the upper relay assembly will be deenergized. Relays PMR and RR of the same relay assembly will be energized. The relays CL', CYB', BR' and MYB' of the lower relay assembly will also be deenergized. Relays PMR' and RR' of the lower relay assembly will both be energized.

Relay PMR is energized via the A.C. power from the minor movement controller MMS through contact 98/99 of energized relay PR, through line 99' as seen in the Fig. 4 to the parent controller Fig. 3*b* to line 99P, to the coil of relay PMR to line L22 to ground. The relay PR in Fig. 4 became energized from A.C. power in the parent controller in Fig. 3*b* from contact *ag*3/*ag*1 through line 213*p*, line 213' to the minor movement controller in Fig. 4, relay PR to ground 30. Contact *ag*3/*ag*1 closed on release of relay AG by opening cam contact C7 in leaving position 2 of the parent controller.

Relay PR is energized from A.C. power in the parent controller via line L23, contact *br*1, line L24, the coil of relay RR, line L25 to ground.

Relay RR closes its contact *rr*1/*rr*2 and causes signal 303' to be illuminated via a circuit from A.C. power through line L27, contact *rr*1/*rr*2 of relay RR, contact *c*1–1/*c*1–3 of relay CL to the signal 303'. This signal is the green signal shown in Fig. 1, displayed to through and right turn traffic from the north on Street A.

The relay PMR closes its contact *pm*1 to prepare a ground connection for relay YB in the minor movement controller in Fig. 4, through lines 212P, and 212'' to the right side of relay YB.

In the presently assumed position 3, the phase B green position of the parent controller, the circuits for energizing relays PMR' and RR' of the lower relay group in Fig. 3*b* may be traced with respect to the minor movement controller MMN in a manner similar to that described above for the corresponding relays PMR and RR for the upper relay group except for the identification of the corresponding energizing circuits by addition of primes.

Thus relay PMR' is energized via A.C. power from minor movement controller MMN through contact 98'/99' of energized relay PR' in controller MMN (corresponding to relay PR of Fig. 4) and through line 99' as seen in Fig. 4 (99N of Fig. 2) to the parent controller in Fig. 3*b* at line 99P', to the coil of relay PMR' to line L22' to ground.

The relay PR' in the minor movement controller MMN became energized from A.C. power in the parent controller from contact *ag*3 (of Fig. 3*b*) through line 213P, 213N (of Fig. 2), to the minor movement controller MMN corresponding to Fig. 4, at line 213', relay PR' to ground 30, as the parent controller left its position 2 and released relay AG, as described above for relay PR.

Relay RR' is energized in position 3 from A.C. power in the parent controller, via line L23' contact *br*1', line L24', the coil of relay RR', line L25' to ground.

Relay RR' closes its contact *rr*1'/*rr*2' and causes signal 303 to be illuminated, via a circuit from A.C. power through line L27, contact *rr*1'/*rr*2' of relay RR', contact $c1-1'/c1-3'$ of relay CL' to signal 303. This is the green signal shown in Fig. 1, displayed to through and right turn traffic from the south on Street A.

The relay PMR' closes its contact $pm1'$ to prepare a ground connection for relay Y'B' in the minor movement controller MMN, as illustrated in Figs. 2 and 4, through lines 212P', 212N (of Fig. 2), 212'' (of Fig. 4) to the right side of relay Y'B' (corresponding to relay YB of Fig. 4).

In the position 3 of the parent controller assumed, signals 301' and 302' are deenergized because contacts $rr1/rr3$ and $c1-1/c1-2$, respectively are open in Fig. 3*b*. These are the red and yellow signals for north through traffic—"Phase A Major No. and Phase B." Similarly signals 301 and 302 are deenergized because contacts $rr1'/rr3'$ and $c1-1'/c1-2'$ respectively are open. These are the corresponding red and yellow signals on "Phase A Major So. and Phase B."

The operation of the wiper overlap relay group in the lower part of Fig. 3*b* will now be described for the sequence of operation of the parent controller from phase B to phase C and directly back to phase B, while the minor movement controllers remain at rest.

Let it now be assumed that the parent controller advances from position 3 to position 4 as previously described in preparing to transfer right of way to phase C. Since phase C is next to be accorded right of way, relay CYX in Fig. 3*b* is energized over contacts $by4$ and $j12$ as described in the aforementioned patent.

The right sides of relays CYB and CYB' are connected to A.C. power 20' through lines L23 and L23' respectively, as is also the left side of the coil of relay CYX. The left sides of relays CYB and CYB' are connected to the right side of relay CYX via line L20 and line 60' and via lines L20', L20 and line 60' respectively.

It will thus be seen that the relays CYB and CYB' are connected in parallel with relay CYX of the parent controller, and this results in relays CYB and CYB' also being energized with relay CYX as just described above.

For the sake of simplicity, the operation of the upper of the two groups of relays below the line XL1 in Fig. 3*b* will be described as generally representative of both upper and lower groups. The operation of the lower group is identical and may be seen by substitution of the lines, contacts and relays, bearing the same designations except that a prime mark is added.

With relay CYB energized, a circuit is completed from power at line 20' through line L28 to contact $rr3/rr1$ to line L31 to contact $cy9$, now closed, through relay CL, to ground. Relay CL is thus energized, and contacts $c1-3/c1-1$ open to break the circuit to green signal 303', extinguishing it, and at the same time contact $c1-1/c1-2$ closes, supplying power to illuminate yellow signal 302', for the phase A north through and right movement.

When the parent controller has timed the clearance interval in position 4, it advances to position 5, the phase C green interval. The parent controller now deenergizes relay BG and relay CYX of Fig. 3*b* as described in the aforementioned patent. Release of relay BG closes contacts $bg1/bg3$ to energize relay BR, which results in the opening of contacts $br1$. Since it was stated previously that relay PMR was energized, it will now be seen that with both contacts $pm2$ and $br1$ open, relay RR becomes deenergized. The circuit feeding yellow signal 302' is thus broken by contact $rr1/rr2$ opening, extinguishing this signal. A circuit is now completed from A.C. power 20' via line L27, contacts $rr1/rr3$ to illuminate signal 301', the stop signal for phase A north through and right turn movements. The release of relay CYX also deenergizes the parallel relay CYB.

The parent controller will now time the accord of right of way to phase C as described in the previous patent, which is Street B in the present case.

Let us assume that the detector 11B or 11B' of Fig. 1 has been actuated by the approach of a vehicle in the south through lane or north through lane respectively, but that there has been no actuation of either left turn detector and the minor movement controllers are still at rest in their position 1. The parent controller, on completion of its timing in position 5, will now go to position 6, and with the minor movement controllers inactive and non-actuated as assumed, the parent controller will have received no "call" for phase A since such "call" comes only from the minor movement controllers. The parent controller will therefore skip phase A and go directly to phase B, after skipping through positions 6 and 1 and timing the phase C clearance period in position 2, all as previously described more fully in the said Barker Patent 2,100,831.

As the parent controller reaches position 3 again, it energizes relay BG by cam contact C9, and thus opens contact $bg3/bg1$. This in turn causes relay BR in lower Fig. 3*b* to become deenergized, reclosing contact $br1$ and thus reenergizing relay RR, as previously described. Since relay CYB is no longer energized, it will be seen that relay CL is also deenergized by open contact $cy9$ despite closure of contact $rr4$.

We have now returned to the relay and signal conditions previously described as position 3 of the parent controller.

In the immediately preceding description of operation of the parent controller from its position 3 through its positions 4, 5 and 6 and back to position 3 no mention has been made of relays PMR, PMR', MYB and MYB'. Relays PMR and PMR' are energized as previously described, and both relays remain energized throughout all the steps just described. Relay MYB which is associated with minor movement controller MMS, and relay MYB' which is associated with minor movement controller MMN, are and remain deenergized, since it is assumed that there is no demand for either left turn, and hence that both minor movement controllers remain at rest. The operation of these relays will be further described in connection with the operation of signals 301, 302, 303, 301', 302', and 303' when "calls" have been received on one or both of the minor movement controllers.

Fig. 3*c* is a cam shaft chart associated with the parent controller of Figs. 3*a* and 3*b*. The numbers 1 through 6 on the top of the chart indicate the six positions of the cam shaft of the parent controller. The numbers along the left side of the chart 1 through 32 indicate the several cam contacts associated with the cam shaft corresponding to those with a prefix "*c*" in Figs. 3*a*–3*b*, but with this prefix omitted in Fig. 3*c*. The "X" in the box or boxes to the right of the numbered cam contact indicates that the cam contact is closed in that position of the cam shaft as is indicated at the top of the chart.

Reference is now made to Fig. 4, which is a schematic presentation of the preferred form of one of the minor movement controllers with connections to the parent controller. At the lower right of Fig. 4, marked off by the line 200, are externally located signal lights 201 to 209 and detector 101, all grounded to a common ground 30. At the lower left marked off by line 200' and called "Parent Controller" is a parent controller the like of which is illustrated in Fig. 3 (3*a*–3*b*–3*c*) and the several interconnecting lines between a parent controller and a minor movement controller.

Part of several of the circuits of Fig. 4 are illustrated in broken line, except for line 210' which is indicated by a broken line with a dot and surrounded by broken lines C210. The parts of those circuits illustrated in broken line, including line 210' illustrated as aforesaid, are present in my aforesaid copending application entitled "Traffic Actuated Control Apparatus" (but are not used in the present application. These circuits include line 218'; part of the illuminating circuit for signal 201; part of the illuminating circuit for signal 202 including line 100; the entire part of the illuminating circuit signal 209 through line 210'; part of the illuminating circuit for signal 206 from contact 83/82; part of the illuminating circuit for the signal 207; and part of the illuminating circuit for signal 208, including line 114.

Fig. 4 is arranged for operation by an alternating current input, 20, of approximately 120 volts, which is used to illuminate the external signals 202 through 208, signals 201 and 209 being illuminated by an external source when such signals are used.

The several relays MD, AS, BS, MM, PR, PG, YR and GR control a plurality of contacts. Relay MD controls contacts 88, 89, 116/117 and 117/118; relay AS controls contact 94; relay BS controls contacts 123 and 124; relay MM controls contacts 125, 54 and 52; relay PR controls contacts 97/98, 98/99 and 102; relay PG controls contacts 70, 71 and 96; relay YB controls contacts 90/91, 91/92, 105, 106, 103, 108, 109 and 161; relay YR controls contacts 111/112, 112/113; and relay GR controls contacts 82/83, 83/84, 76/77, 77/78, 104, 73/74, 74/75, 58 and 72.

The alternating current input 20 is used to energize relays YR and GR while the alternating current input 20' of the parent controller energizes relays PR, YB and PG through the respective terminals and switches in the parent controller.

The alternating current input 20 is also used to obtain an alternating current low voltage supply, 21, of approximately 12 volts by use of a familiar step-down transformer, for example (not shown here). The low voltage alternating current, 21, is used to energize relays MD and MM and to apply a small alternating current potential on the cathode 22 of tube 25 via a potential divider made up of resistors 26 and 28 on line 27.

The direct current input 31, on the order of 350 volts for example, may be obtained by the use of any of several familiar methods if direct current is not available on location. The direct current supply is used for timing. There are two timing circuits. One is made up of timing capacitor 49, the timing charging resistor 42, relay BS, tube 35 and the associated reset discharge resistor 51. A second circuit is made up of timing capacitor 50, one of the timing charging resistors 44, 46, 48 and 131, relay AS, tube 25 and the associated reset discharge resistor 53. The timing method used may be any of the several electrical, mechanical, or electronic methods or any combination of them. The preferred timing method here used is an electronic method employing a capacitor-gas discharge tube combination to energize a relay at the end of the timed period.

The direct current supply 31 is used to charge the capacitors 49 and 50 through a potential divider made up of resistors 132, 133 and 134 to control the amount of voltage, which voltage is tapped off by taps 37 through 40 and 129, any of which may be connected to any point on resistor 133. The resistors 41 through 48, 130 and 131, below the respective taps, control the rate of current flow into the timing elements of the respective circuits. Resistors 42, 44, 46, 48 and 131 are adjustable via their respective taps 56, 36, 119 and 126 and 145 so that the rate of current flow may be adjusted to control the timing as desired.

One timing circuit, used primarily to set a maximum limit to the minor movement green period, is charged from direct current input 31, through resistor 132, part of resistor 133, tap 37, resistors 41 and 42, tap 56, and via contact 58 if closed, or, if open, then via resistor 57, line 59, line 60, timing capacitor 49, and returning via line 121, point 122, line 122', line 93 to ground 30. Relay BS is connected in shunt with capacitor 49 via line 59, relay BS, anode 34 and cathode 32 of tube 35 (when conducting), line 154, point 29' to ground 30. Discharge resistor 51 and contact 52 are connected between line 60, the input side of timing capacitor 49, and line 121, the ground side of capacitor 49 to shunt and discharge the capacitor when contact 52 is closed.

The charging circuit of the second timing circuit is determined by the wiper contact F' of the rotary stepping switch as it makes contact with the contacts 1 through 11 of bank F, as described below.

The control grids 23 and 33 of the tubes 25 and 35 respectively have an applied bias of approximately minus 45 volts for example, to hold the tubes from conducting until this bias is reduced. This bias is controlled by the positions of the wiper contact E' on the contact 1 through 11 of the bank E of the rotary stepping switch, which may close a circuit from line 64 through wiper contact E' to ground 30, which completes a circuit from direct current minus 61, through resistor 62, point 65, resistor 63 to line 64. The control grid potential is applied at point 65', and when the circuit is complete, the bias is reduced to approximately minus 14 volts for example so that the tubes 25 and 35 may fire if their respective associated timing capacitors are sufficiently charged.

The selection of circuits as made by the several contacts of the rotary stepping switch may be obtained by various methods. The method here utilizes a rotary stepping switch which is the familiar type switch commonly associated with telephone circuits. There are six banks, A, B, C, D, E, and F of 11 positions 1 through 11. Contact is made upon each bank of the rotary switch by a set of bridged wipers A', B', C' and D' respectively. Wipers E' and F' are not bridged.

The wipers are attached to a shaft that is rotated by motor magnet MM which when energized notches a ratchet gear (not shown) on the shaft, and when then deenergized rotates the shaft so that the wipers advance from one position to the next, in unison. As the wipers leave position 11, it is assumed that they next make contact with position 1, as by multiple sets of wipers for example, as is well known in the art.

The contacts 101 represent the detector contacts 10A or 10A' which are externally located as seen in Fig. 1.

The manual switch or pushbutton 102' is representative of a manual switch which may be used for direct operation of motor magnet MM for manual control of the minor movement controller if desired.

The lights 66, 67, 68, and 69 are indicator lamps and are used to indicate, in the case of the 12 volt lamp 66, when the MD relay is energized, and in the case of lamp 67, when the yellow signal 207 is illuminated and/or when the YB relay is energized, and in the case of lamp 68, when the yellow signal 204 is illuminated and the clearance interval of the minor phase is being timed, and in the case of lamp 69, when the signal 203 is illuminated which is the green signal of the minor phase. These lamps may be 120 volt neon lamps for example.

In the lower left of Fig. 4 marked off by line 200' and marked "Parent Controller" will be seen terminals indicated by small circles, to which the interconnect lines between the minor movement controller and the parent controller are connected.

The lines 216' and 219' of the minor movement controller are connected to the parent controller through lines 216P and 219P respectively to control the timing of the parent controller as will be explained hereinafter. The line 215' in the minor movement controller is connected to the line 215P in the parent controller. The letters BD in the parent controller indicate that the line 215P is connected to relay BD in the parent controller. Similarly line 214' of the minor movement controller is connected to the line 214P in the parent controller and the line 214P is connected to the relay AD in the parent controller. The line 211' of the minor movement controller is connected to line 211P of the parent controller which line is connected to contact *ayx*3 in the parent controller. Line 213' of the minor movement controller is connected to line 213P in the parent controller which line is connected to contact *ag*3 in the parent controller.

Broken line XL1 in the parent controller is similar to the broken line XL1, in the Fig. 3*b*. The line 212″ on the right side of relay YB in the minor movement controller is connected to the parent controller to line 212P through which the relay YB receives a ground connection in the parent controller. The line 103′, from contact 103 in the minor movement controller, is connected to line 103P through which A.C. power is applied to relay MYB in the parent controller for minor movement controller MMS for example, and is connected to line 103P′ to supply A.C. power to relay MYB′ in the parent controller for minor movement controller MMN. The line 99′, leading from contact 99 in the minor movement controller, supplies A.C. power through line 99P to relay PMR in the parent controller for minor movement controller MMS, and through line 99P′ to relay PMR′ in the parent controller for minor movement controller MMN.

The minor movement controllers MMS and MMN illustrated in block form in Fig. 1 and Fig. 2 are identical to the minor movement controller illustrated in schematic form in Fig. 4, but for convenience of reference a few parts or interconnecting lines of the minor movement controller of Fig. 4 have had identifying prime marks or letters N or S added in Fig. 2 in designating the corresponding parts in the respective controllers, and some of the external parts such as detectors and signals are individually associated with the respective controllers MMN and MMS, as shown in Figs. 1 and 2, and have primes added to the identifying numbers in Figs. 1 and 2.

The minor movement controller is here presented in a rest condition with relay PG energized and the parent controller in position 1. The relay PG is energized from the parent controller power 20′, through contact *ag*1—*ag*2 of relay AG, and contact *ayx*1—*ayx*3 of relay AYX, via line 211P, line 211′ through the coil of relay PG to ground 30. The ground 30 in the minor movement controller is here considered to be a common ground with the parent controller ground line.

The minor movement controller is actuated via closure of contact 101, which represents its vehicle detector. An energizing circuit for relay MD is closed thereby energizing relay MD, which relay causes certain of its contacts to close. A high bias that holds the tubes in the timing circuits above cutoff is reduced so that the tubes may pass current when the timing capacitors are properly charged. With passage of current through either tube 25 or 35 relay AS or BS respectively will be energized to effect energization of the motor magnet MM. The motor magnet MM notches a ratchet mechanism and also completes a discharge circuit for the timing capacitors 49 and 50 via contact 52 and 54 respectively.

The relays AS and BS or either one which had become deenergized opens the energizing circuit for motor magnet MM. Upon deenergization of motor magnet MM the cam shaft is advanced to the next position 2 by the ratchet mechanism.

Position 2 sends a "call" from the minor movement controller to the parent controller via a circuit which is grounded at line 30 and follows through wiper A′, position 2 of bank A, contact 70 of relay PG, line 215′ to the parent controller to relay BD, the detector relay of phase B. Should the parent controller be in phase C or phase B at this time the relay PG would be deenergized and contact 70 would be opened and the "call" would not be made. However, should the parent controller be resting in phase A, the relay PG would be energized and the "call" would be completed. In position 2 the reduced bias on the grid of tubes 25 and 35 is maintained so that when the timing capacitor becomes charged the tube or tubes will pass current to cause advance of the rotary stepping switch to the next position.

Position 3 opens the "call" to the parent controller completed in position 2 and prepares a second "call" circuit to call the parent controller to phase A so that the minor phase of the minor movement controller may be inserted into the cycle. This second call circuit is prepared from ground 30, via wiper A′ and position 3 of bank A, and is completed via contact 71 of relay PG, and line 214′ (via line 214S or 214N for minor movement controller MMS or MMN respectively) to line 214P, to relay AD in the parent controller, when the parent controller moves from its position 1 to its position 2, that is, from phase A green to phase A yellow or clearance, at which time relay PG is deenergized to close contact 71.

The minor movement controller must remain in position 3 unless or until relay PG becomes deenergized to close contact 96, which contact when open, opens the charging circuit that charges capacitor 50.

The relay PG is deenergized when the parent controller leaves position 1 and opens its contact *ayx*1—*ayx*3 of relay AYX thereby breaking the energizing circuit for relay PG. When the parent controller leaves position 2, the phase A yellow position, contact *ag*1—*ag*3 of relay AG closes, and the relay PR in the minor movement controller is energized. The parent controller applies power from 20′ through contact *ag*1—*ag*3 through line 213P to the minor movement controller to line 213′, through the coil of relay PR to ground 30, to energize relay PR.

Energized relay PR closes its contact 98/99 and completes an energizing circuit from A.C. power 20 in the minor movement controller through contact 99, line 99′ to the parent controller, line 99P.

When the charging circuit is completed through the closed contact 96 of relay PG, now deenergized, and the capacitor 50 becomes fully charged the tube 25 passes current to effect an advance of the several banks of switches to position 4.

In position 4 one "call" circuit to the parent controller that was closed in position 3 is opened. The minor movement controller will remain in position 4 unless or until the relay YB becomes energized because the high bias on the grid of tubes 25 and 35 must pass to ground via contact 91/92 of relay YB which is open so long as relay YB is deenergized.

In my copending application I have shown the relay YB energized by power supplied by the parent controller with a constant ground connection in the minor movement controller. In Fig. 4 herein I am showing the relay YB receiving a power supply from the minor movement controller with the parent controller supplying a ground connection for relay YB at the proper time in the cycle of the parent controller. Although the circuit is reversed, the results are similar in effect.

Relay YB serves to assure that the insertion of the minor movement right of way period by the minor movement controller, in response to actuation, will be at the proper point in the cycle of the parent controller at the beginning of phase A.

Relay YB is energized from the A.C. power supply 20 in the minor movement controller through line 212′, the coil of relay YB, line 212″ to the parent controller, line 212P to receive a ground connection in the parent controller.

When the relay YB is or becomes energized the contact 91/92 closes and the high bias on the grid of the tubes 25 and 35 is reduced so that when the capacitor 49 or 50, as the case may be becomes fully charged, the respective tube in the circuit passes current and effects the advancement of the rotary stepping switch to position 5.

In position 5 the relay GR is energized from A.C. input 20, through the coil of relay GR, position 5 of bank A, wiper A′ to ground 30.

The relay GR closes its contact 83/84 and completes a circuit from A.C. power 20 through contact 83/84, closed contact 103 of relay YB, line 103′ to the parent controller to line 103P.

Relay GR also closes its contact 77/78 to keep power supplied to line 99′ when relay PR will become deenergized. This shunting circuit follows from A.C. power 20 in the minor movement controller to contact 77/78, line 81 to line 99′ to the parent controller line 99P.

As more fully described in my copending application, when the minor movement controller is at rest in position 1 and through its advance into position 5 the red signal 205 is illuminated.

The red signal 205 is illuminated, while at rest from A.C. power 20 through contact 76/77 of relay GR, lines 79, 80 to signal 205 to ground 30. The other shunting circuits to illuminate the signal 205 are fully described in my copending application as aforesaid entitled "Traffic Actuated Control Apparatus."

When the relay YB becomes deenergized the high bias which was holding the tubes from passing current, is removed and the minor movement controller advances to position 6 when the tubes pass current as aforesaid.

In position 6 the minor movement controller stops the timing in the parent controller by opening the circuit from the parent controller via lines 219P, 219′ to the minor movement controller at open contact 73/74 of relay GR, and open contact 105 of relay YB.

Relays YB and PR become denergized at the same time and as they become deenergized with relay GR energized the signal 205 is extinguished since all its illuminating circuits are open. The signal 203 is now illuminated from the A.C. input 20 via contact 97/98 of relay PR, contact 109 of relay YB, contact 104 of relay GR, line 110, contact 111/112 to signal 203 to ground.

In position 6 the relay PG is energized by the parent controller and the minor movement controller times its initial interval of the minor phase of phase A.

Upon termination of the initial interval the rotary stepping switch is advanced to position 7 during which the extendible vehicle interval of the minor phase of phase A is timed. At the termination of the extendible vehicle interval the stepping switches advanced to position 8 and the relay YR is energized from the A.C. power supply 20 of the minor movement controller, through the coil of relay YR, position 8 of the bank B, wiper B′ to ground 30.

The green signal 203 is extinguished by open contact 111/112 of relay YR and the yellow signal 204 is illuminated from the A.C. power supply 20, contact 97/98, contact 109, contact 104, line 110, contact 112/113 of relay YR to signal 204 to ground 30.

The clearance interval of the minor phase of phase A is timed by the minor movement controller. At the termination of the clearance interval the rotary stepping switch is advanced to position 9 and the minor phase of phase A terminates.

In position 9 the relay GR becomes deenergized and the timing power is restored to the parent controller by closure of contact 73/74 of relay GR so that the parent may continue in its cycle and serve whatever demands traffic has made on the parent controller or come to rest in its phase A position if no further demands have been made by traffic.

The red signal 205 is illuminated and the yellow signals 204 is extinguished.

The minor movement controller now advances rapidly through positions 9, 10 and 11 and comes to rest in its position 1 to await further "calls" through vehicle detector 101.

The alternate method of control of the parent controller timing by the minor movement controller as fully disclosed in Fig. 3*a* of my aforesaid copending application entitled, "Traffic Actuated Control Apparatus" may also be employed in my present system in lieu of the method of control of parent timing presented herein.

It should be noted that for independent operation of the parent controller as presented in Patent 2,100,831, the switch SW10 in Fig. 3*a* of the present case would be closed.

The operation of the upper overlap relay group of Fig. 3*b* will now be considered in the operation of the parent controller from phase C to phase A in response to actuation of one of the minor movement controllers during or prior to accord of right of way to phase C. Assume the parent controller to be resting in position 5 (phase C green).

Let it now be assumed that a vehicle crosses detector 10A connected to minor movement controller MMS. Minor movement controller MMS moves from its rest position 1 through positions 2 and 3, to position 4 of its stepping switch calling phase A of the parent controller via line 214P to relay AD as controller MMS passed through its position 3.

The parent controller will advance from rest in its position 5, phase C green, to position 6, phase C yellow.

The YB relay of minor movement controller MMS (Fig. 4) will then be energized and the controller MMS will advance to its position 5 as previously described. The parent controller will then advance to position 1, phase A green, while the minor movement controller will advance into its minor green interval, position 6, but keeping line 99′ energized via closed contact 77—78 of relay GR, energized in positions 5—8 of bank A of the minor movement controller (Fig. 4).

Relay PMR (of Fig. 3*b*) which is now connected to line 99′ via line 99P, thus remains energized. Since the parent controller also keeps line L32 energized via contact *bg*3/*bg*1, relay BR remains energized.

It can be seen that with contacts *br*1 and *pm*2 open relay RR is thus held in a deenergized postion, and red signal 301′ continues to be illuminated by contacts *rr*1/*rr*3.

When the minor movement controller MMS completes its green intervals in its positions 6 and 7 and its clearance intervals in position 8 it advances to its position 9 and thus deenergizes the line 99′ by release of relay GR and opening of its contacts 77—78. Thus in turn deenergizing relay PMR in Fig. 3*b* via line 99′—99P a circuit is now completed from power at line 20′ to line L23, to contacts *pm*–2, to line L24 through the coil of relay RR, and to line L25 to ground. Relay RR is thus energized, completing the circuit to illuminate green signal 303′ at contacts *rr*1/*rr*2 and extinguishing red signal 301′ by opening contacts *rr*1/*rr*3.

Since contacts 77—78 of relay GR of minor movement controller MMN are open, as this controller is at rest in its position 1, the deenergization of relay PR of minor movement controller MMN as a result of the operation of the parent controller will open the circuit from power at line 20 through contacts 98—99 of relay PR to line 99P′ to relay PMR, Fig. 3*b*, thus deenergizing this relay. A circuit is now completed from power at line 20′ to line L23′, to contacts *pm*–2′ to line L24′ through the coil of relay RR′ and to line L25′ to ground. Relay RR′ is thus energized, completing the circuit to illuminate green signal 303 at contacts *rr*1′/*rr*2′ and extinguish red signal 301 by opening contacts *rr*1′/*rr*3′. This results in the green signal to the phase A major south through and right turn movement, which can run simultaneously with the phase A minor south left turn movement being illuminated.

Let us assume that a call has been received on phase B. The parent controller will advance to position 2 on completion of timing brief periods of phase A major green in its position 1. Relay AYX will be energized, via contact *ay*2, *j*9 in the parent controller in Fig. 3*b*, but relay YB in the minor movement controller will be deenergized because the circuit to relay YB is open at contacts *pm*1.

When the parent controller has completed timing the phase A clearance interval, it advances to position 3. The normal phase B red signal circuit (phantom signal BRS)

of the parent controller is deenergized, deenergizing relay BR. The relay PR in minor movement controller MMS is energized by circuits previously described. This completes a circuit from power at line 20 to contacts 98—99 in Fig. 4 to line 99' to line 99*p* to relay PMR to line L22 to ground to energize relay PMR. This opens contact *pm2*, but relay RR does not drop because when relay BR was deenergized, contacts *br1* closed to complete an alternate circuit to the coil of relay RR. It will thus be seen that, since relay CL is not operated in any of the above mentioned steps in position 1 of the parent controller following release of relay GR by the minor movement controller and in positions 2 and 3 of the parent controller, the green signal 303' remains illuminated without interruption for the associated through traffic movement, thus overlapping phase A major and phase B parts of the signal cycle. Phase A major follows phase A minor provided by minor movement controller at the beginning of phase A of the parent controller.

The conditions in the phase B green position 3 are as previously described.

The sequence of operation from phase B to the phase A minor and phase A major will now be described. Let us assume that, with the parent controller again in its position 3, a call is received for the same left turn as before, but that no phase C call is received. The minor movement controller MMS will step from its rest position 1 through its positions 2 and 3 and call for parent controller phase A, via line 214P to operate relay AD. The parent controller will advance from phase B green position 3 to phase B clearance position 4.

However, since there is no call on phase C, the parent controller will skip rapidly through positions 4 and 5 and stop in position 6 by action of relay J as previously described. Relay AYX will be energized as described in the Barker Patent 2,100,831, since phase A is to be accorded the right of way next.

There is now a circuit, previously prepared, from the relay AYX, via line 52' to line L21 to contacts *pm1* to line 212P to line 212'' through relay YB and to power 20 via line 212'. Since the left side of relay AYX is connected to power at line 20' and lines 20 and 20' are both connected to the same source of power, relay YB is energized, since it is in parallel with relay AYX.

Minor movement controller MMS now advances to position 5 and causes its GR relay to be energized as previously described. A circuit is now completed from power 20 via contacts 83—84 on relay GR and contact 103 at relay YB to line 103P through relay MYB and to ground at line L22. Relay MYB is thus energized, closing a circuit from power 20' via line L28, contact *rr4*, line L30, contact *myb1* and line L29, through relay CL to ground to energize relay CL. Contacts c11/c13 open, extinguishing green signal 303', and contact c11/c12 close, illuminating yellow signal 302'. When the parent controller times out its phase B yellow, it advances to position 1. Relay BR is energized as previously described, and relay RR is deenergized. This causes yellow signal 302' to be extinguished and red signal 301' to be illuminated, as in the previous example. The sequence of events is now the same as in the previous case.

Again note that it has been assumed that a "call" had been received for the left turn associated with minor movement controller MMS only. The operation of relay PMR' will be identical to that previously described in connection with the movement of the parent controller from position 6 to position 1. Relay BR' which was deenergized in position 4, becomes energized in position 1 by closure of contacts *ag1—ag3* of the relay AG in the parent controller. However, relay PMR' also becomes deenergized as a result of the deenergization of relay PR of minor movement controller MMN and the resultant opening of its contacts 98—99 as previously described. The energization of relay BR' opened contacts *br1'*, but an alternate circuit is completed from power at line 20' via line L23', contacts *pm2'* to the coil of RR' relay to keep this relay energized to keep green signal 301 illuminated without interruption.

Let is now be assumed that there have been actuations of both minor movement controllers MMN and MMS by their respective left turn detectors 10A' and 10A, while the parent controller is in its position 3, according right of way to phase B. Let it also be assumed as before that there is a call for phase C, i.e. relay CD is energized.

Under the assumed conditions both minor movement controllers will advance independently from their respective rest positions 1 to their respective positions 3, as previously described at which point each controller places a call for phase A on the parent controller, via the call circuit previously described via line 214P to energize relay AD, relay PG being energized in each controller MMN and MMS in the condition assumed. As previously described, the minor movement controllers proceed from position 3 to position 4 where they remain until the parent controller completes the timing of its position 3 (phase B green), position 4 (phase B yellow), and position 5 (phase C green) in accordance with actuations on phase B and C.

When the parent controller reaches its position 6, the phase C yellow position, which is the "yellow before" phase A where the minor phases are to be inserted, the relays YB and Y'B' in the controllers MMS and MMN will be energized over lines 212P and 212P' respectively and their respective lines 211'' shown in Fig. 4, the energizing circuits having been prepared by the contacts *pm1* and *pm1'* in Fig. 3*b* respectively, and completed by closure of contact *cy4* of relay CY in Fig. 3*b* in the phase C yellow period with contact *j12* of relay J also closed, which supplies power via line 52' to relay AYX in Fig. 3*b* and also via the parallel lines L21 and L21' to contacts *pm1* and *pm1'*.

Relays YB and Y'B' at their contacts 91—92 close a timing control circuit to advance the controllers MMS and MMN from position 4 to position 5 as previously described.

As soon as the parent controller completes its phase C clearance period it advances from its position 6 to its position 1 where it would normally accord right of way to phase A directly except for the intervening action of the minor movement controllers inserting the respective minor phases, so that the accord of right of way to the phase A major movements is deferred until completion of the respective minor phases which start together if both actuated as assumed but which may end at different times depending on their timing and traffic actuations.

However, when the parent controller advances into its position 1 as described above the relays PR in the respective minor movement controllers MMS and MMN are deenergized by the opening of the respective contacts *ag1—ag3* and *ag1'—ag3'* in Fig. 3*b* in the parent controller, as relays AG and AG' are energized in the parent controller, as previously described in position 1 of phase A in connection with Patent 2,100,831 with Fig. 3 of the patent modified by Fig. 4 of the patent illustrated in Fig. 3*b* of the present case.

Such deenergization of relay PR causes its contact 102 to open, and with the opening of contact 103 of relay YB released at this time, the minor red signal 205 is extinguished. Also with relays PR and YB deenergized by the parent controller moving into its position 1, the contacts 93—97 and 109 close to complete a circuit previously prepared by contact 104 of relay GR to energize and illuminate the minor green signal 203, as the minor movement controller advances from positions 6 to 7. Since both minor movement controllers have been assumed actuated the corresponding contact actions in these two controllers will thus extinguish red signals 205 and 205′ for south and north left turns and will illuminate the green signals 203 and 203′ for such left turns.

The minor movement controllers MMS and MMN will time the display of the green signals 203 and 203′ respectively between minimum and maximum limits in accordance with traffic actuations in the respective left turns and then each proceeds independently to its minor clearance period in its position 8 to illuminate its associated yellow signal 204 or 204′ and extinguish its associated green signal 203 or 203′, as more fully described above and in my copending application. Upon completion of timing of the respective periods, the minor movement controllers proceed to their respective positions 9 and continue through their stepping switch cycles without change of signals, after going from position 8 to position 9, at which time each controller extinguishes associated yellow signal 204 or 204′ and restores its associated red signal 205 or 205′ while returning control of the respective opposing through movement green and red signals 303′ and 301′ on the north and 303 and 301 on the south to the parent controller.

With either of the minor movement controllers in its positions 6—7—8, the timing of the parent controller is interrupted via lines 216P, 219P and contacts in the minor movement controllers to hold the parent controller in its position 1, and upon the last of the two minor movement controllers moving out of position 8, the timing of the parent controller is restored to permit it to time the major phase part of phase A, in which the accord of right of way to the two straight through movements of north and south overlaps from phase B when the latter follows or immediately precedes phase A.

Fig. 5 is a signal sequence chart illustrating, for example, one complete cycle of the parent controller plus one phase of a second cycle. On the extreme left of the diagram under the heading "Controlled By," is indicated the device that controls the signals including MMS, for minor movement controller south, P.C. for parent controller and MMN for minor movement controller north.

Under the heading "Traffic Flows" will be found the traffic flows as also indicated on Fig. 1, "St. A No. Through And Rt. Turn" for through and right turn traffic from the north approach on Street A, "St. A So. Left Turn" for left turn traffic from the south approach on Street A. These traffic flows are controlled by either the parent controller or the minor movement controller MMS or a combination of both controllers.

"St. A So. Through And Rt. Turn" represents the through and right turn traffic flow from the south approach on Street A, while "St. A No. Left Turn" refers to the left turn traffic flow from the north approach on Street A. These traffic flows are controlled by either the minor movement controller MMN or the parent controller or the combination of both of them.

"Street B" refers to the traffic flows from both east and west approaches on Street B, which is controlled by the parent controller.

Across the top of the chart are the several phases of the parent controller, "Ph. B" for phase B, "Ph. C" for phase C and "Phase A" for phase A. The phase A is subdivided into "Minor" and "Major." Phases B and C are divided into parts as indicated by the numbers with the small "*p*" after the number, and the minor and major subdivisions of phase A are also similarly divided.

The letters R, G and Y represent the signals red, green and yellow respectively. Reading across the chart from left to right one may determine the controlling unit, a traffic flow and all the signals that may be displayed to such traffic flow during the phases, indicated on the top of the chart, during one complete cycle with both minor phases of phase A inserted into the cycle of the parent controller followed by phase B of a second incompleted cycle.

During phase B, periods 1*p* and 2*p*, a green signal for go is shown on Street A in period 1*p* for through and right turn traffic from both the north and south, followed by a yellow signal for clearance in period 2*p*. Periods 9*p* and 10*p* are similar to 1*p* and 2*p* respectively.

During phase C, periods 3*p* and 4*p*, the green signal for go followed by the yellow signal for clearance respectively are displayed in succession to traffic on Street B.

Here it has been assumed that both the minor movement controllers MMS and MMN have been actuated so that both the minor phases, followed by the major phases of phase A appear. Period 5*p* displays green signals to both left turn traffic flows on Street A, followed by a yellow signal displayed in period 6*p* to such traffic flows.

Periods 7*p* and 8*p* indicate green signals displayed for through and right turn traffic on Street A for both north and south approaches. It will be noticed that period 8*p*, which is the second part of the major phase of phase A shows a green signal rather than a yellow signal. This is due to the fact that the phase B signals are about to be displayed and the parent controller cooperates with the minor movement controller to maintain the green signal in period 8*p*. However, should phase B of the parent controller cycle be skipped and phase C signals were to be displayed the green signals in period 8*p* would be replaced by a yellow signal.

It should be noted that the parent controller may rest in periods 1*p*, 3*p*, 7*p* or 9*p*, period 9*p* being equivalent to 1*p*, both being a phase B rest period. The parent controller may not rest in either periods 5*p* or 6*p* of the minor phase of phase A. The heavy dark line indicates the end of the major phase of phase A.

Fig. 6 is similar to Fig. 5 except that the signal sequence chart presupposes that phase C, before phase A, has been skipped due to an absence of vehicle traffic and that both minor movement controllers are actuated. Also assumed is that one of the minor movement controllers MMN terminates its minor phase of phase A before the other and the minor movement controller first terminating its minor phase, for example MMN, cooperates with the parent controller to display the major phase of phase A to the through and right turn traffic on Street A from the south while the minor phase of phase A as controlled by minor movement controller MMS is maintained longer.

Termination of the minor phases of phase A at different times may be caused by one of the minor phases being extended via vehicle actuation sent to its respective minor movement controller thereby extending its vehicle interval of its minor phase for a longer period of time than the other minor movement controller extends its vehicle interval of its minor phase because of an absence of, or fewer vehicle actuations.

Fig. 6 illustrates the minor phase as displayed to the left turn traffic on Street A from the south being extended to show a green signal in periods 13*p* as well as 13*pa* and 13*pb* while the left turn traffic on Street A from the north only displays a green signal in period 13*p* followed by a yellow in period 13*pa*. In period 13*pb* a red signal is displayed to left turn traffic on Street A, north while a green signal is displayed to through and right turn traffic on Street A south. The extension of the green signal in periods 13*pa* and 13*pb* followed by the yellow signal in period 14*p* for left turn traffic on Street A south causes the red signal to remain displayed to through and right turn traffic on Street A north during periods 13*pa*, 13*pb* and 14*p*.

It may be assumed that, should the element of time be considered, periods 13*p* and 13*pa* may represent the minimum time period that the minor phase of phase A may be displayed while periods 13*p*, 13*pa*, 13*pb* and 14*p* may represent the maximum time period that the minor phase of phase A may be displayed. Therefore either minor phase may terminate at the end of period 13*pa* or period 14*p*.

When one minor phase terminates earlier than the other and major phase displayed to the diagonally opposite through and right turn traffic flow following the shorter minor phase, is lengthened by the amount of time the longer minor phase is extended.

Periods 11*p* and 12*p* are comparable to periods 1*p* and 2*p* of Fig. 5 respectively and periods 15*p* and 16*p* of Fig. 6 are comparable to periods 7*p* and 8*p* of Fig. 5 respectively.

The heavy dark line again, as in Fig. 5, indicates the end of the phase A periods, and the lighter solid vertical line between periods 14*p* and 15*p* indicate the end of the minor phase for the south left turn and the beginning of the major phase for north through and right turn, and the corresponding solid vertical line between periods 13*pa* and 13*pb* illustrate the end of the minor phase for the north left turn and the beginning of the major phase for south through and right turn.

The asterisk in the boxes below period 16*p* indicate that should phase B be skipped and phase C follow phase A the green signal would become a yellow signal in this period.

Fig. 7 is similar in form to Figs. 5 and 6. However, in Fig. 7 it is presupposed that only one minor movement controller, MMS, for example, has been actuated by vehicular traffic while minor movement controller MMN, for example, remains at rest due to an absence of actuation of vehicular traffic.

As in Fig. 6, the Fig. 7 also assumes that phase C has been skipped due to an absence of actuation by vehicle traffic.

It will be noticed that a green signal is maintained to through and right turn traffic from the south on Street A during periods 22*p* as well as 21*p* and, since the minor movement controller MMN remains at rest, it does not insert its minor phase into phase A. Therefore a red signal is displayed during periods 23*p* and 24*p* in place of the green and yellow signals displayed by the actuated minor movement controller MMS.

The red signal in periods 23*p* and 24*p* are displayed to the left turn traffic flow on Street A north, a green signal is displayed in periods 23*p* and 24*p* to through and right turn traffic on Street A south.

Period 25*p* is comparable to period 15*p* of Fig. 6 and period 7*p* of Fig. 5, while period 26*p* would display a yellow signal in place of the green signal if phase B were to be skipped and phase C were to follow phase A. Periods 27*p* and 28*p* are comparable to periods 17*p* and 18*p* of Fig. 6 respectively, and periods 9*p* and 10*p* of Fig. 5 respectively.

It is obvious that in both Figs. 6 and 7 the conditions of the minor movement controllers would be reversed. This condition could be seen in both Figs. 6 and 7 by merely interchanging the traffic flows, interchanging the north traffic flows of Street A with the south traffic flows of Street A and also interchanging the associated minor movement controllers MMS and MMN.

Although the column "Controlled By" has been omitted for convenience in Figs. 6 and 7 this column will be understood to apply to Figs. 6 and 7 as illustrated above in Fig. 5 on the same sheet of drawings.

In the aforementioned Patent 2,100,831 and also in the description above the cycle of operation has been described without the modification here presented in Fig. 3*a*, including ganged switches SW20—SW20′, contact *cd*7 of relay CD and cam contact C32, but assumes switch SW20′ closed and switch SW20 open as shown. With the recall switches 13′, 14′ and 15′ also all open as shown the parent controller may rest in phase A (major) B or C.

Should it be desired that the parent controller not rest in phase A but rest in phase B the switch SW20′—SW20 may remain as shown, and recall switch 14′ may be closed while recall switches 13′ and 15′ remain open.

This combination would cause the parent controller to advance through and out of its phase A positions at the termination of the minor and major parts of phase A and into phase B position, without vehicle actuation on phase B.

Such recall to phase B also has the effect of inserting phase B unnecessarily in event of a vehicle "call" only on phase C in leaving phase A.

The latter can be avoided in a preferred arrangement, with recall switches 13′, 14′ and 15′ open, switch SW20′ open and switch SW20 closed, and cooperating with cam contact C32 closed only in position 1 of the parent controller as shown in Fig. 3*c*. With this preferred arrangement the parent controller will, in absence of a phase C call, advance out of its phase A position into its phase B position after displaying the minor part and major part of its phase A.

The cam contact C32 will close in position 1 to provide a ground connection for relay CS from line 34′ through line L33, closed switch SW20, cam contact C32 to ground to cause the parent controller to advance into position 2 at the termination of the green period timing of the major phase of phase A.

The relay J will be deenergized so that there is no skipping of phases, and the parent controller advances into phase B, position 3 after timing phase A, position 2.

If, however, there had been a call for phase C and no call for phase B when the parent controller advanced into position 2, the relay J would be energized in position 2 from A.C. power, through line 16′, the coil of relay J, line 19′, contact *ay*5, if relay AY closed, contact *cd*7 of energized relay CD, closed contact *bd*6 of deenergized relay BD, line 17′ to ground.

With the relay J thus energized in position 2 the parent controller would advance rapidly through positions 2 and 3 and time the clearance interval of phase A position 4, as described in the aforementioned Patent 2,100,831.

This modification will prevent the parent controller from resting in the major phase of phase A green, position 1, but will allow the parent controller to rest in either phase B green or phase C green positions.

It is obvious that although the minor movement controllers have been here associated with phase A to control left turn traffic from Street A for example, such minor movement controllers may be associated with any other phase, phase B or phase C, in lieu of phase A of the parent controller to control left turn traffic and with the opposing straight through traffic overlapping into the following phase, and with the cross street on the phase succeeding such following phase.

While a preferred embodiment of the invention has been set forth and a number of alternate arrangements described, it will be appreciated by those skilled in the art that various other modifications might be made without departing from the spirit of the invention.

I claim:

1. A traffic control system for intersecting streets having traffic movements including left turn movements from two opposite approaches of one street and straight through traffic movements on the respective two approaches, and traffic movements on a second street interfering with the several traffic movements aforesaid on the first street, said system including a parent controller for normally according right of way alternatively between the traffic movements on said second street and the straight through movements together on said first street in response to actuation by traffic in the respective traffic movements on said second street and straight through traffic movements on said first street, said parent controller having a time cycle for such accord of right of way including three phases, only the second and third of which normally appear in such time cycle in absence of actuation on the respective left turn lanes, the second phase corresponding with accord of right of way to said straight through movements and the third phase corresponding with accord of right of way to said other street, two minor movement controllers individual to the respective left turn movements for normally interrupting right of way in said left turn movements while said parent controller is normally according right of way alternatively to said straight through movements on said one street and to said traffic movements on said other street, and said minor movement controllers adapted to be operated in response to actuation by traffic in the respective left turn movements to operate said parent controller to the first phase of its cycle to accord through respective actuated minor movement controllers right of way to the respective left turn movements in the first part of said first phase and for interrupting right of way in the interfering straight through traffic movements and for returning to said parent controller in the latter part of said first phase the control of said straight through movements following such accord of right of way to the respective left turn movements interfering therewith, said accord of right of way to the respective straight through movements continuing into said second phase as aforesaid.

2. In a traffic control system for more than two interfering traffic lanes, including a first lane and a second lane interfering with the remaining of said lanes except different ones of certain of said lines but not interfering with each other, and having signals for accord and interruption of right of way to the respective lanes and for clearance of traffic in the respective lanes following accord of right of way, traffic actuated means in the respective lanes, a parent controller having a three phase control cycle for cyclically according right of way to said certain of said lanes and to others of said lanes except said first and second lanes, in response to actuation in said certain lanes and said other lanes respectively, said cyclic accord of right of way including accord of right of way to said certain lanes in the second of said three phases and accord of right of way to said other lanes in the third of said three phases, minor movement controllers associated with said first and second lanes respectively and each operated individually in response to actuation of its associated traffic actuated means to interrupt said normal cyclic accord of right of way by said parent controller to one of said first and second lanes and to accord right of way to its associated said one of said first and second lanes at a particular part of the cycle of said parent controller by operating said parent controller to the first of its three phases, each said minor movement controller including means for returning control of the one of said certain lanes which interferes with its associated one of said first and second lanes to said parent controller upon completion of said accord of right of way and the following clearance period by said minor movement controller, and said minor movement controllers each including means for holding said parent controller in said particular part of its cycle until both of said minor movement controllers have completed such accord of right of way and following clearance period when so actuated by the respective traffic actuated means.

3. A system as in claim 2 and in which said parent controller includes means for having the accord of right of way overlap from said second phase into said first phase following such return of control to the parent controller to accord of right of way to the respective certain lanes.

4. A system as in claim 3 in which each minor movement controller includes means to call the parent controller to said particular part of its cycle when the parent controller is in another part of its cycle and to call the parent controller away from said particular part of its cycle and back to said particular part of its cycle when said parent controller is already in said particular part of its cycle.

5. A system as in claim 4 which includes means for timing said minor movement right of way to be extendible between minimum and maximum limits by actuation of the associated traffic actuated means for the respective controllers, and means operated by said maximum means to call the parent controller again to said particular part of its cycle in said first phase and to call said minor movement controller to so provide the minor movement right of way therein without further traffic actuation.

6. A system as in claim 2 and in which each minor movement includes means for so holding the parent controller in said particular part of its cycle in said first phase by stopping the timing of said parent controller therein.

7. In a traffic control system for more than two interfering lanes having signals for accord and interruption of right of way in the respective lanes and for clearance of traffic in the respective lanes following accord of right of way, a parent controller for normal cyclic accord of right of way in the lanes in succession except in a first and second of said lanes, which interfere with certain of the other lanes but are non-interfering with respect to each other, traffic actuated means in said first and second lanes and in the other lanes, said normal cyclic accord of right of way being in response to actuation of the respective traffic actuated means in all but said first and second lanes and being provided on two out of three phases of the cycle of said parent controller, minor movement controllers individual to said first and second lanes for individually interrupting said normal cyclic accord of right of way by said parent controller to said certain lanes at a particular part of a cycle of said parent controller in the first of said three phases of said parent controller and to accord right of way to its associated one of said first and second lanes for a time period extendible between minimum and maximum limits by actuation of its respective associated traffic actuated means in its associated one of said first and second lanes and to provide a following clearance period to its associated one of said first and second lanes and then to return to the parent controller the control of accord of right of way to the one of said certain lanes with which its associated one of said first and second lanes is interfering, and said minor movement controllers each including means cooperating with the other minor movement controller to return the parent controller to normal cyclic accord of right of way to said certain lanes while interrupting right of way in both said first and second lanes upon a completion of the accord of right of way and the following clearance period for whichever of said minor movement controllers have so completed their respective such periods, and means in said parent controller for providing an overlap of said accord of right of way to said certain lanes between said second phase and said first phase after said particular part of its cycle in which said minor movement controllers so complete their respective such periods of right of way and clearance, said right of way overlapping means also including means for maintaining accord of right of way in place of a clearance period in event of transfer of accord of right of way from said first phase to said second phase in response to actuation in one of said certain lanes, and said overlapping right of way means including also means for terminating accord of right of way in said certain lanes and providing a clearance period therein in the event of transfer of right of way by said parent controller from said certain lanes in its said phase to any lanes other than said certain lanes in any other of said phases other than said second phase.

8. A system as in claim 7 and in which said overlapping means includes means individual to the respective first and second lanes for the respective minor movement controllers and the respective said ones of said certain lanes associated therewith and with the parent controller for providing such overlap of accord of right of way and a clearance period therefor individual to the respective said certain lanes.

9. In a traffic signal control system for several traffic lanes, the combination of a parent controller having three phases in a time cycle for traffic signal control normally between the second and third of said phases in response to traffic actuation of said second and third phases respectively, two minor movement controllers for cooperation with said parent controller for traffic signal control for normal interruption of right of way in a first and second of the lanes controlled by the traffic signal while permitting accord of right of way to certain others of said lanes under control of said parent controller in the second of two phases, and for according right of way to the respective first and second lanes in the first part of a first phase of said three phases of said parent controller and for returning the control of said signals to said normal condition of interruption of right of way in the respective first and second lanes and accord of right of way to the respective certain lanes in the second part of said first phase of said parent controller cycle, and means associated with said parent controller and said minor movement controllers for providing an overlap of accord of right of way to the respective ones of said certain lanes between said second phase of said parent controller and the second part of said first phase of said parent controller.

10. In a system having a parent controller for control of traffic signals for interfering traffic lanes in association with two minor movement controllers on one of its three phases of a control cycle for such signal control and including two other phases for normal cyclic accord of right of way between certain and others of said interfering lanes in response to traffic actuation in the respective lanes except for the traffic lanes associated with the minor movement controllers, the combination of means associated with the parent controller and one of the minor movement controllers to provide for overlapping accord of right of way to said certain lanes between the second of said phases and the first of said phases following accord of right of way to one of the first and second lanes, and means associated with said parent controller and the other of said minor movement controllers for providing an overlap of accord of right of way to another of said certain lanes between said second phase and said first phase following accord of right of way to the other of said first and second lanes by said other minor movement controller.

11. A combination as in claim 10 in which said last named means includes relay means for providing such overlapping accord of right of way for the respective said certain lanes and including a clearance period for said signal following accord of right of way for the respective said certain lanes only preceding interruption of such accord of right of way to said respective certain lanes.

12. A combination as in claim 10, and in which said last named means includes relay means individual to the respective certain lanes and having output circuits for the control of stop, go and clearance signals therefor and having input circuits from the parent controller and from the associated minor movement controller for control of said relay means in response to operation of the parent controller in two successive phases of its cycle and in response to operation of said minor movement controller before and after its accord of right of way and clearance, said relay means including means operated by the associated minor movement controller immediately before accord of right of way to its associated lane to replace the overlapping go signal operation by a clearance signal operation for the interfering one of said certain lanes, and to replace said overlapping go signal operation with a stop signal operation in response to said associated minor movement controller according right of way and providing clearance thereafter.

13. A system as in claim 10, and including means for causing said parent controller to leave its said first phase automatically and proceed to said second phase in absence of actuation of its third phase after completion of said accord of right of way and the following clearance period by the respective minor movement controllers.

14. A system as in claim 7, and including means for causing said parent controller to leave its said first phase automatically and proceed to said second phase in absence of actuation of its third phase after completion of said accord of right of way and the following clearance period by the respective minor movement controllers.

No references cited.